(12) United States Patent
Proffitt et al.

(10) Patent No.: US 9,174,811 B2
(45) Date of Patent: Nov. 3, 2015

(54) VEHICLE RESTRAINTS WITH ROTATING AND TRANSLATING BARRIERS

(75) Inventors: Greg Proffitt, Waukesha, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 427 days.

(21) Appl. No.: 13/604,315

(22) Filed: Sep. 5, 2012

(65) Prior Publication Data

US 2014/0064892 A1    Mar. 6, 2014

(51) Int. Cl.
*B65G 69/34* (2006.01)
*B65G 69/00* (2006.01)

(52) U.S. Cl.
CPC .................................. *B65G 69/003* (2013.01)

(58) Field of Classification Search
CPC ..................................................... B65G 69/003
USPC ......................................................... 414/401
See application file for complete search history.

(56) References Cited

U.S. PATENT DOCUMENTS

| | | |
|---|---|---|
| 2,722,449 A | 11/1955 | Harley |
| 4,208,161 A | 6/1980 | Hipp et al. |
| 4,267,748 A | 5/1981 | Grunewald et al. |
| 4,282,621 A | 8/1981 | Anthony et al. |
| 4,373,847 A | 2/1983 | Hipp et al. |
| 4,379,354 A | 4/1983 | Hahn et al. |
| 4,472,099 A | 9/1984 | Hahn et al. |
| 4,560,315 A | 12/1985 | Hahn |
| 4,605,353 A | 8/1986 | Hahn et al. |
| 4,648,781 A | 3/1987 | Sikora |
| 4,674,941 A * | 6/1987 | Hageman ...................... 414/401 |
| 4,759,678 A | 7/1988 | Hageman |
| 4,843,373 A | 6/1989 | Trickle et al. |
| 4,861,217 A | 8/1989 | Erlandsson |
| 4,887,954 A | 12/1989 | Gregerson et al. |
| RE33,242 E | 6/1990 | Hipp et al. |
| 4,988,254 A | 1/1991 | Alexander |
| 5,026,242 A | 6/1991 | Alexander |
| 5,071,306 A | 12/1991 | Alexander |

(Continued)

FOREIGN PATENT DOCUMENTS

| | | |
|---|---|---|
| CA | 2140743 | 6/1999 |
| CN | 1926034 | 3/2007 |

(Continued)

OTHER PUBLICATIONS

Rite-Hite Holding Corporation, "G3 Posi-Lok," 4 sheets drawings/text, Drawing # 1262; Drawing # 56158; dated Sep. 26, 1989.

(Continued)

*Primary Examiner* — James Keenan
(74) *Attorney, Agent, or Firm* — Hanley, Flight & Zimmerman, LLC

(57) ABSTRACT

Example vehicle restraints with rotating and translating barriers are disclosed herein. An example vehicle restraint disclosed herein a main body installable at a loading dock and a barrier to be coupled to the main body. The barrier rotates about an axis relative to the main body between an upper blocking position to block the RIG and a stored position to release the RIG, where for a given elevation of the main body the barrier being higher in the upper blocking position than in the stored position. The barrier moves radially with respect to the axis.

25 Claims, 24 Drawing Sheets

(56) References Cited

U.S. PATENT DOCUMENTS

| | | | |
|---|---|---|---|
| 5,096,359 A | 3/1992 | Alexander | |
| 5,120,181 A | 6/1992 | Alexander | |
| 5,203,663 A | 4/1993 | Ruppe | |
| 5,297,921 A | 3/1994 | Springer et al. | |
| 5,340,181 A | 8/1994 | Matsuyama | |
| 5,348,437 A | 9/1994 | Krupke et al. | |
| 5,505,575 A * | 4/1996 | Alexander | 414/401 |
| 5,882,167 A | 3/1999 | Hahn et al. | |
| 6,139,242 A | 10/2000 | Alexander | |
| 6,162,005 A | 12/2000 | Fritz | |
| 6,431,819 B1 | 8/2002 | Hahn | |
| 7,841,823 B2 | 11/2010 | Sveum et al. | |
| 8,616,826 B2 * | 12/2013 | Cotton et al. | 414/809 |
| 2004/0042882 A1 * | 3/2004 | Breen | 414/401 |
| 2005/0169732 A1 | 8/2005 | Sveum et al. | |
| 2006/0045678 A1 * | 3/2006 | Andersen | 414/401 |
| 2008/0095598 A1 | 4/2008 | Cotton et al. | |
| 2010/0266375 A1 | 10/2010 | Ion | |
| 2011/0158778 A1 | 6/2011 | Harrington | |
| 2011/0243694 A1 | 10/2011 | Andersen et al. | |
| 2012/0087772 A1 | 4/2012 | Cotton et al. | |
| 2013/0017044 A1 | 1/2013 | Brooks et al. | |
| 2013/0017045 A1 | 1/2013 | Brooks et al. | |
| 2014/0064891 A1 | 3/2014 | Brooks | |
| 2015/0210487 A1 | 7/2015 | Brooks et al. | |
| 2015/0217951 A1 | 8/2015 | Lessard et al. | |

FOREIGN PATENT DOCUMENTS

| | | |
|---|---|---|
| WO | 2013009960 | 1/2013 |
| WO | 2014035727 | 3/2014 |

OTHER PUBLICATIONS

United States Patent and Trademark Office, "Non-Final Office Action," issued in connection with U.S. Appl. No. 13/182,049, mailed on Apr. 4, 2012, 14 pages.
International Searching Authority, "International Search Report," issued in connection with International patent application No. PCT/US2012/046416, mailed on Sep. 28, 2012, 5 pages.
International Searching Authority, "Written Opinion of the International Searching Authority," issued in connection with International patent application No. PCT/US2012/046416, mailed on Sep. 28, 2012, 7 pages.
United States Patent and Trademark Office, "Final Office Action," issued in connection with U.S. Appl. No. 13/182,049, mailed on Oct. 25, 2012, 10 pages.
United States Patent and Trademark Office, "Non-Final Office Action," issued in connection with U.S. Appl. No. 13/233,884, mailed on Nov. 19, 2012, 21 pages.
United States Patent and Trademark Office, "Final Office Action," issued in connection with U.S. Appl. No. 13/233,884, mailed on Mar. 15, 2013, 13 pages.
United States Patent and Trademark Office, "Non-Final Office Action," issued in connection with U.S. Appl. No. 13/182,049, mailed on Apr. 11, 2013, 18 pages.
United States Patent and Trademark Office, "Advisory Action," issued in connection with U.S. Appl. No. 13/233,884, mailed on Jul. 19, 2013, 8 pages.
United States Patent and Trademark Office, "Notice of Allowance and Fee(s) Due," issued in connection with U.S. Appl. No. 13/182,049, mailed on Oct. 17, 2013, 18 pages.
International Bureau, "International Preliminary Report on Patentability," issued in connection with International patent application No. PCT/US2012/046416, mailed on Jan. 23, 2014, 8 pages.
United States Patent and Trademark Office, "Notice of Allowance," issued in connection with U.S. Appl. No. 13/182,049, mailed on Jun. 23, 2014, 5 pages.

United States Patent and Trademark Office, "Restriction Requirement," issued in connection with U.S. Appl. No. 13/233,884, mailed on Jun. 19, 2014, 7 pages.
International Searching Authority, "International Search Report," issued in connection with International Application No. PCT/US2013/055808, on Nov. 8, 2013 4 pages.
International Searching Authority, "Written Opinion," Issued in connection with International Application No. PCT/US2013/055808, on Nov. 8, 2013, 7 pages.
United States Patent and Trademark Office, "Notice of Allowance," issued in connection with U.S. Appl. No. 13/182,049, mailed Jan. 20, 2015, 28 pages.
United States Patent and Trademark Office, "Non-Final Office Action," issued in connection with U.S. Appl. No. 13/233,884, mailed Nov. 19, 2014, 30 pages.
State Intellectual Property Office of the People's Republic of China, "First Office Action," issued in connection with Chinese application serial No. 201280034260.X, issued Jan. 12, 2015, 18 pages.
International Searching Authority, "International Preliminary Report on Patentability," issued in connection with International Patent Application No. PCT/US2013/055808, issued on Mar. 3, 2015, 8 pages.
IP Australia, "Patent Examination Report No. 1," issued in connection with Australian Patent Application No. 2012281071, dated Mar. 23, 2015, 3 pages.
Canadian Intellectual Property Office, "Office Action," issued in connection with Canadian Patent Application No. 2,840,237, dated Mar. 12, 2015, 3 pages.
United States Patent and Trademark Office, "Notice of Allowance," issued in connection with U.S. Appl. No. 13/233,884, mailed on Apr. 10, 2015, 22 pages.
Canadian Intellectual Property Office, "Office Action", issued in connection with Canadian Patent Application No. 2,825,536, dated Mar. 31, 2015 (3 pages).
European Patent Office, "Extended European Search Report," issued in connection with European Patent Application No. 15000161.8, on Jun. 15, 2015, 11 pages.
European Patent Office, "Extended European Search Report," issued in connection with European Patent Application No. 15000162.6, on Jun. 15, 2015, 11 pages.
The United States Patent and Trademark Office, "Non-Final Office Action," issued in connection with U.S. Appl. No. 13/599,770, on Jun. 25, 2015, 48 pages.
United States Patent and Trademark Office, "Non-Final Office Action", issued in connection with U.S. Appl. No. 14/174,583, dated Jul. 15, 2015 (48 pages).
IP Australia, "Patent Examination Report No. 1 ," issued in connection with Australian Patent Application No. 2015200158, Aug. 26, 2015, 5 pages.
State Intellectual Property Office of the People'S Republic of China, "Second Office Action," issued in connection with Chinese application serial No. 201280034260.X, issued Aug. 5, 2015, 16 pages.
IP Australia, "Patent Examination Report No. 2," issued in connection with Application No. 2012281071, Sep. 9, 2015, 3 pages.
IP Australia, "Patent Examination Report No. 1," issued in connection with Application No. 2015200174, Sep. 14, 2015, 3 pages.
European Patent Office, "Communication pursuant to Rule 69 EPC," issued in connection with European Patent Application No. 15000162.6, Aug. 17, 2015, 2 pages.
European Patent Office, "Communication pursuant to Rule 69 EPC," issued in connection with European Patent Application No. 15000161.8, Aug. 10, 2015, 2 pages.
United States Patent and Trademark Office, "Notice of Allowance," issued in connection with U.S. Appl. No. 13/599,770, Sep. 29, 2015, 50 pages.

\* cited by examiner

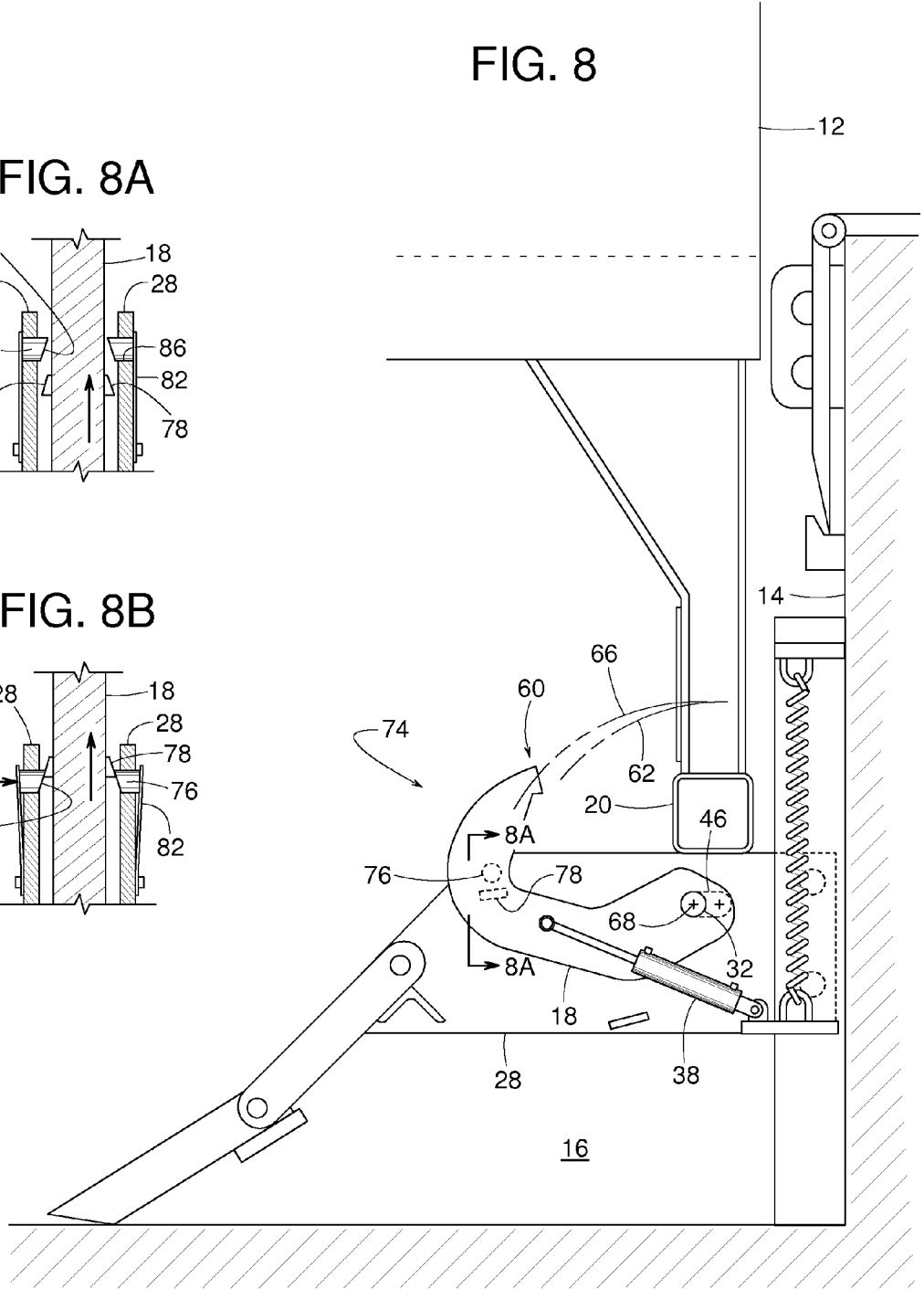
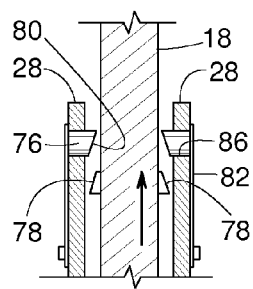
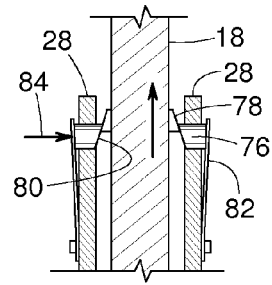

VEHICLE RESTRAINTS WITH ROTATING AND TRANSLATING BARRIERS

FIELD OF THE DISCLOSURE

This patent generally pertains to vehicle restraints at loading docks and, more specifically, to vehicle restraints with rotating and translating barriers.

BACKGROUND

When loading or unloading a truck parked at a loading dock, it is generally a safe practice to help restrain the truck from accidentally moving too far away from the dock. Some known restraints include a hook-style vehicle restraint that engages what is often referred to in the industry as a truck's ICC bar (Interstate Commerce Commission bar) or RIG (Rear Impact Guard). An ICC bar or RIG comprises a bar or beam that extends horizontally across the rear of a truck, below the truck bed. Its primary purpose is to help prevent an automobile from under-riding the truck in a rear-end collision.

A RIG, however, also provides a convenient structure for a hook-style restraint to reach up in front of the bar to obstruct the bar's movement away from the dock. To release the truck and prepare for the next truck to enter, many restraints descend below the bar to a preparatory position. Although the horizontal bar of a RIG is fairly standardized, the bar's supporting structure can vary significantly. In some cases, the supporting structure can interfere with the operation of the restraint.

BRIEF DESCRIPTION OF THE DRAWINGS

FIG. 4A is an end view taken along line 4A-4A of FIG. 4.

FIG. 8 is a side view similar to FIGS. 6 and 7, but showing an example barrier of the vehicle restraint of FIGS. 6 and 7 rising to block the vehicle.

FIG. 8A is a cross-sectional end view taken along line 8A-8A of FIG. 8.

FIG. 8B is a cross-sectional end view similar to FIG. 8A, but showing the example barrier at a slightly higher position.

DETAILED DESCRIPTION

Figure 1:
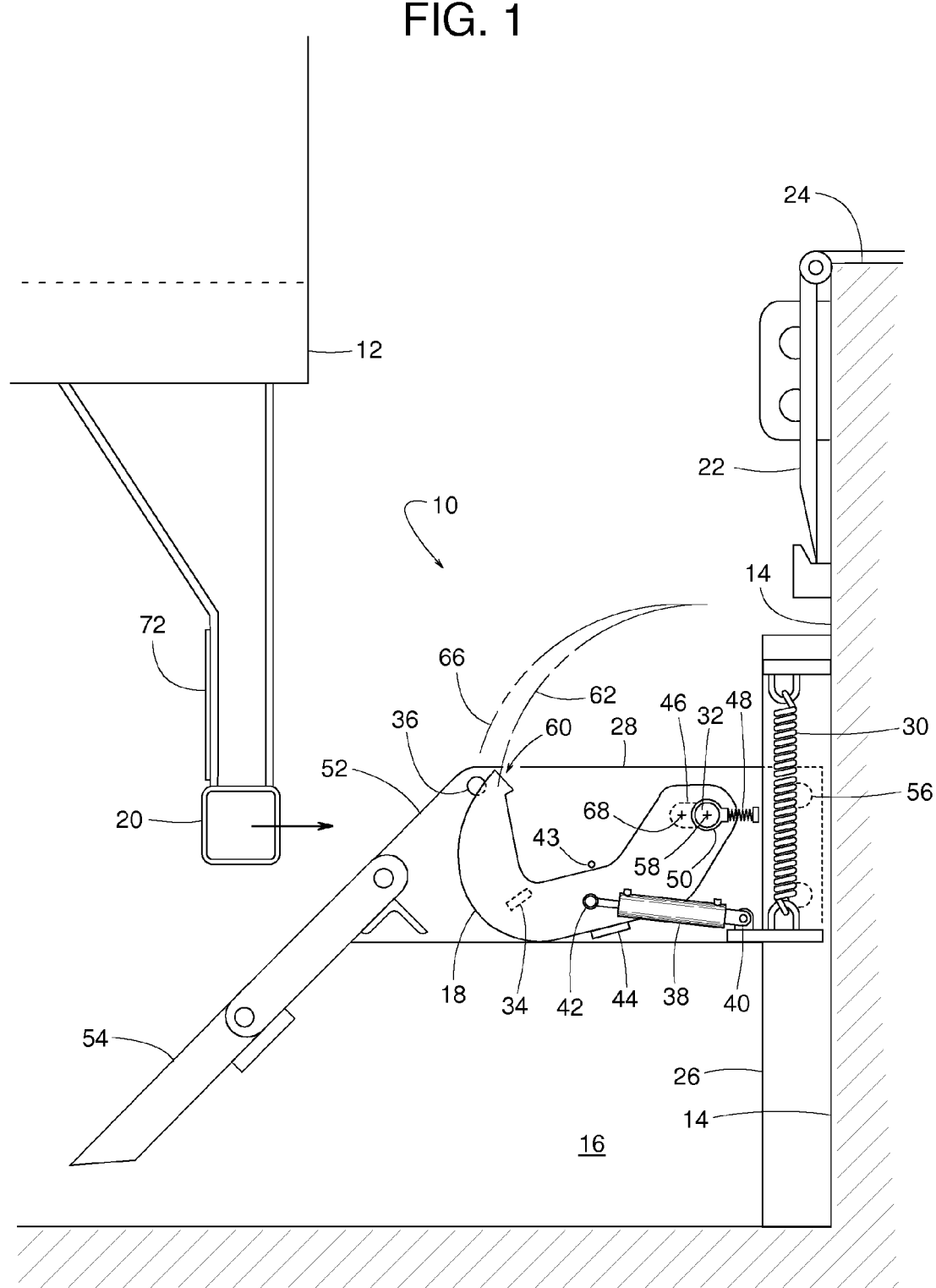
FIG. 1 is a side view of an example vehicle restraint constructed according to the teachings disclosed herein, wherein a vehicle is shown approaching the example vehicle restraint.

FIGS. 1-5 show an example vehicle restraint 10 that helps prevent a vehicle 12 (e.g., truck, trailer, etc.) from accidentally moving too far forward away from a dock face 14 of a loading dock 16 while cargo is being added or removed from the vehicle. To limit such forward movement, restraint 10 includes a barrier 18 moveable to a range of blocking positions for capturing or restraining the vehicle's RIG 20 (Rear Impact Guard), also known as an ICC bar (Interstate Commerce Commission bar). The term, "RIG" encompasses the horizontal impact bar plus the framework and/or structure that connects the bar to the vehicle.

Figure 3:
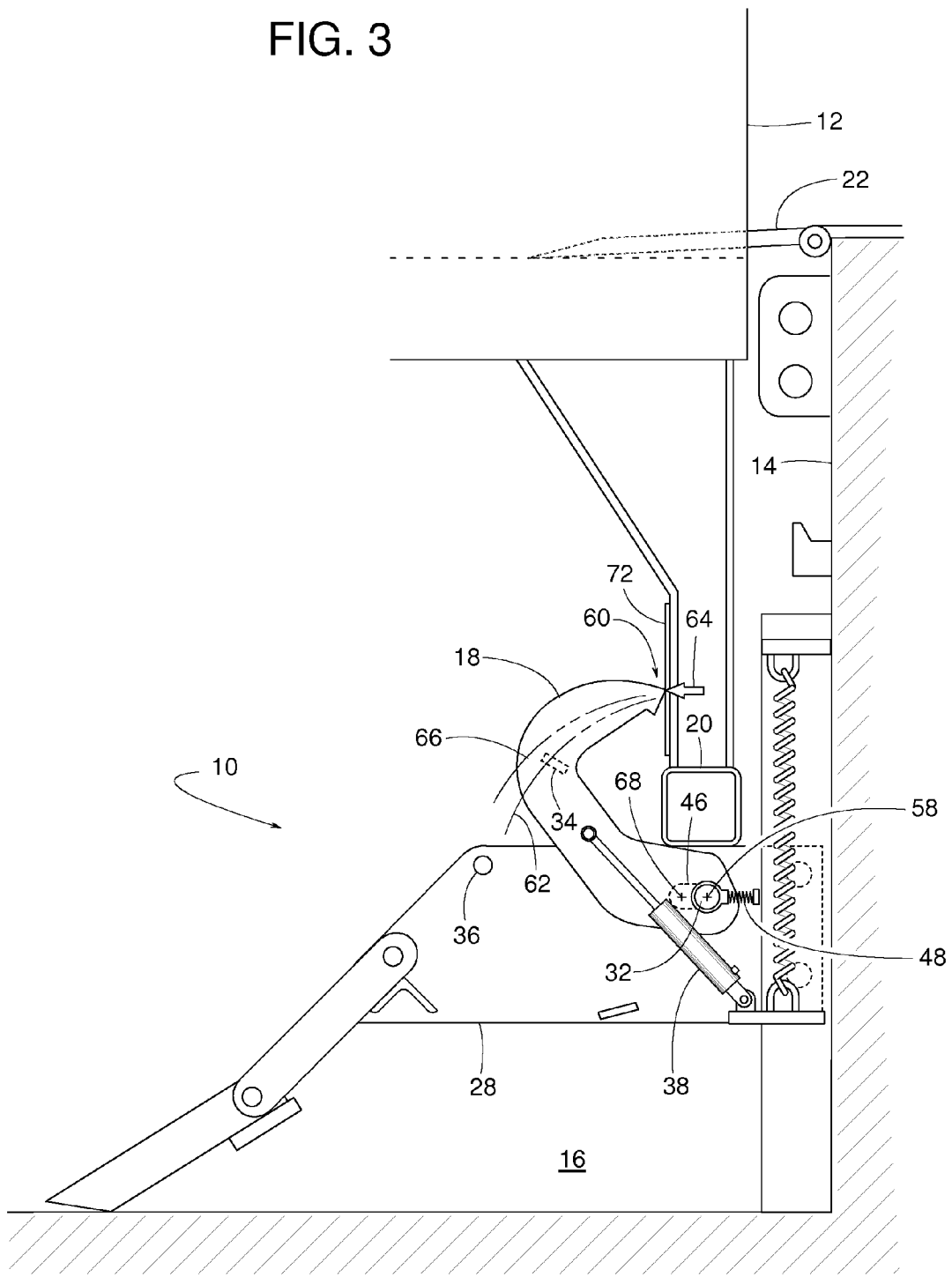
FIG. 3 is a side view similar to FIG. 1, but showing an example barrier of the vehicle restraint of FIGS. 1 and 2 engaging the vehicle.
Figure 4:
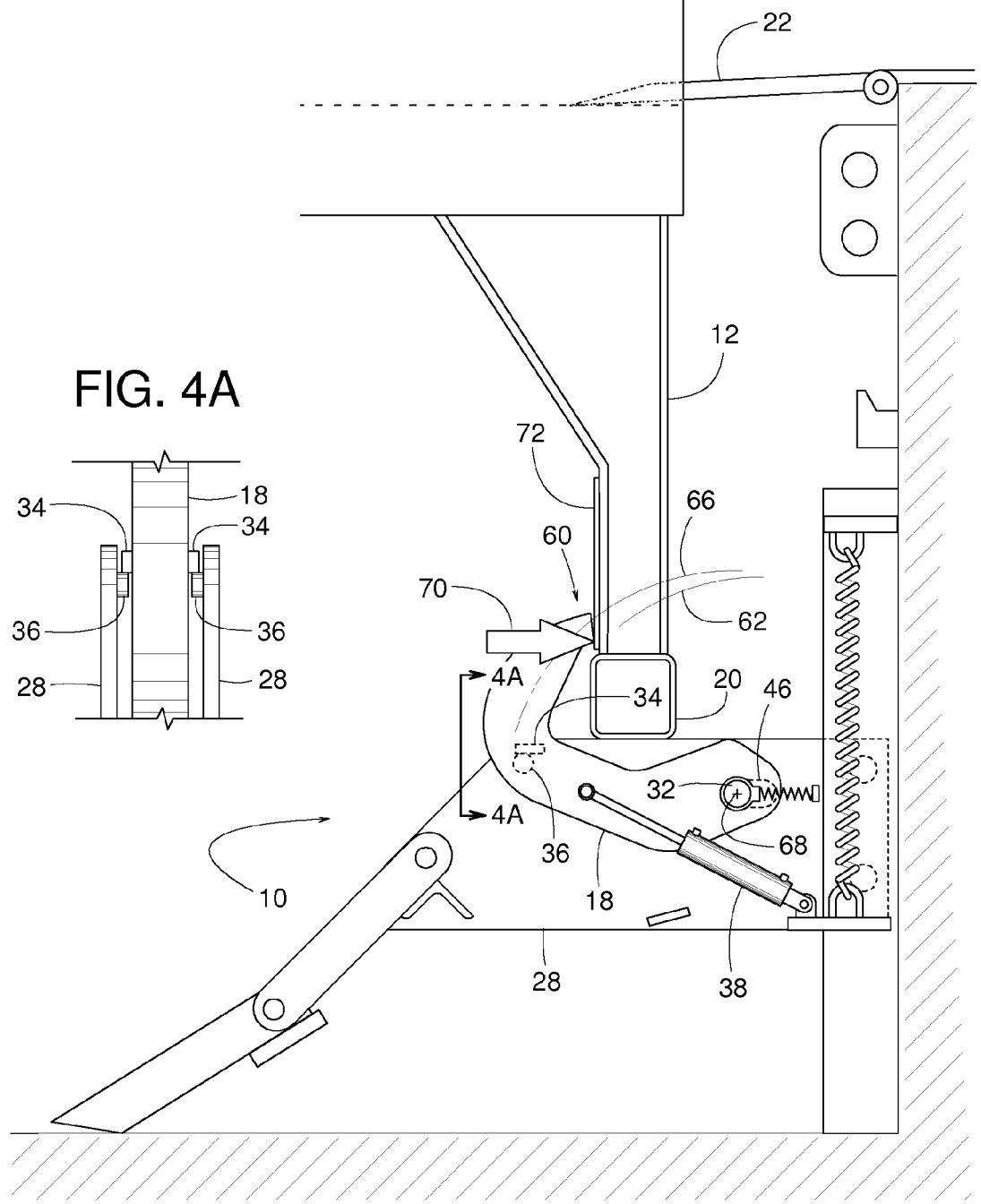
FIG. 4 is a side view similar to FIG. 3, but showing the vehicle having pushed the example barrier to an example intermediate blocking position.

In the illustrated example, the range of blocking positions of barrier 18 includes an upper blocking position (FIG. 3) and an intermediate blocking position (FIG. 4). Barrier 18 is also movable to a stored position (FIGS. 1 and 2) to release vehicle 12. In the illustrated example, the intermediate blocking position is between the upper blocking position and the stored position. With barrier 18 in a blocking position to secure vehicle 12, a dock leveler 22 can be deployed to provide a bridge across which forklifts and other material handling equipment can travel to transfer cargo between vehicle 12 and an elevated platform 24 of dock 16.

The vehicle restraint 10 of the illustrated example includes a track 26 attached to dock face 14, a main body 28 mounted to (e.g., vertically) travel along track 26, one or more springs 30 to urge main body 28 toward the dock leveler 22 (e.g., an upward direction), a shaft 32 to connect barrier 18 to main body 28 such that barrier 18 can rotate relative to main body 28, at least one striker member 34 attached to barrier 18, at least one stop member 36 attached to main body 28, and an actuator 38 to move or rotate barrier 18 between the blocking position, the intermediate blocking position and/or the stored position. In some examples, barrier 18 comprises a solid hook-shaped member. In some examples, barrier 18 comprises two spaced apart parallel plates each being generally hook shaped. The space between the two parallel plates provides an area in which an upper portion of actuator 38 can be located or positioned. In the illustrated example, actuator 38 is shown as a single cylinder (i.e., one piston/cylinder apparatus) with one end 40 connected to main body 28 and an opposite end 42 connected to barrier 18. Other examples of actuator 38 include, but are not limited to, multiple cylinders, a solenoid, a linear motor, an electric motor, a hydraulic motor, a spring, and/or various combinations thereof.

One operation example of vehicle restraint 10 follows the sequence of FIGS. 1-5. FIG. 1 shows vehicle 12 backing into dock 16 and approaching vehicle restraint 10. At this point in the operation, spring 30 holds main body 28 at an elevated preparatory elevation or position to receive RIG 20. To allow vehicle 12 to move RIG 20 over the top of barrier 18, actuator 38 retracts to rotate barrier 18 to its stored position. The barrier's center of gravity 43 relative to shaft 32 assists in rotating barrier 18 to its stored position. FIG. 1 shows barrier 18 resting upon or engaging an end stop 44 that prevents barrier 18 from rotating below or beyond its stored position.

In some examples, shaft 32 is keyed, welded or otherwise affixed to barrier 18 and protrudes through slot 46 in main body 28. Shaft 32 is able to rotate and/or translate within a slot 46. In the illustrated example, a spring 48 urges shaft 32 to the right end of slot 46 as viewed in FIG. 1, thus urging barrier 18 toward dock face 14. In some examples, spring 48 connects to a ring 50 that is coupled to and/or encircles shaft 32 so that spring 48 pulling on ring 50 pulls or urges shaft 32 and barrier 18 toward dock face 14.

Figure 2:
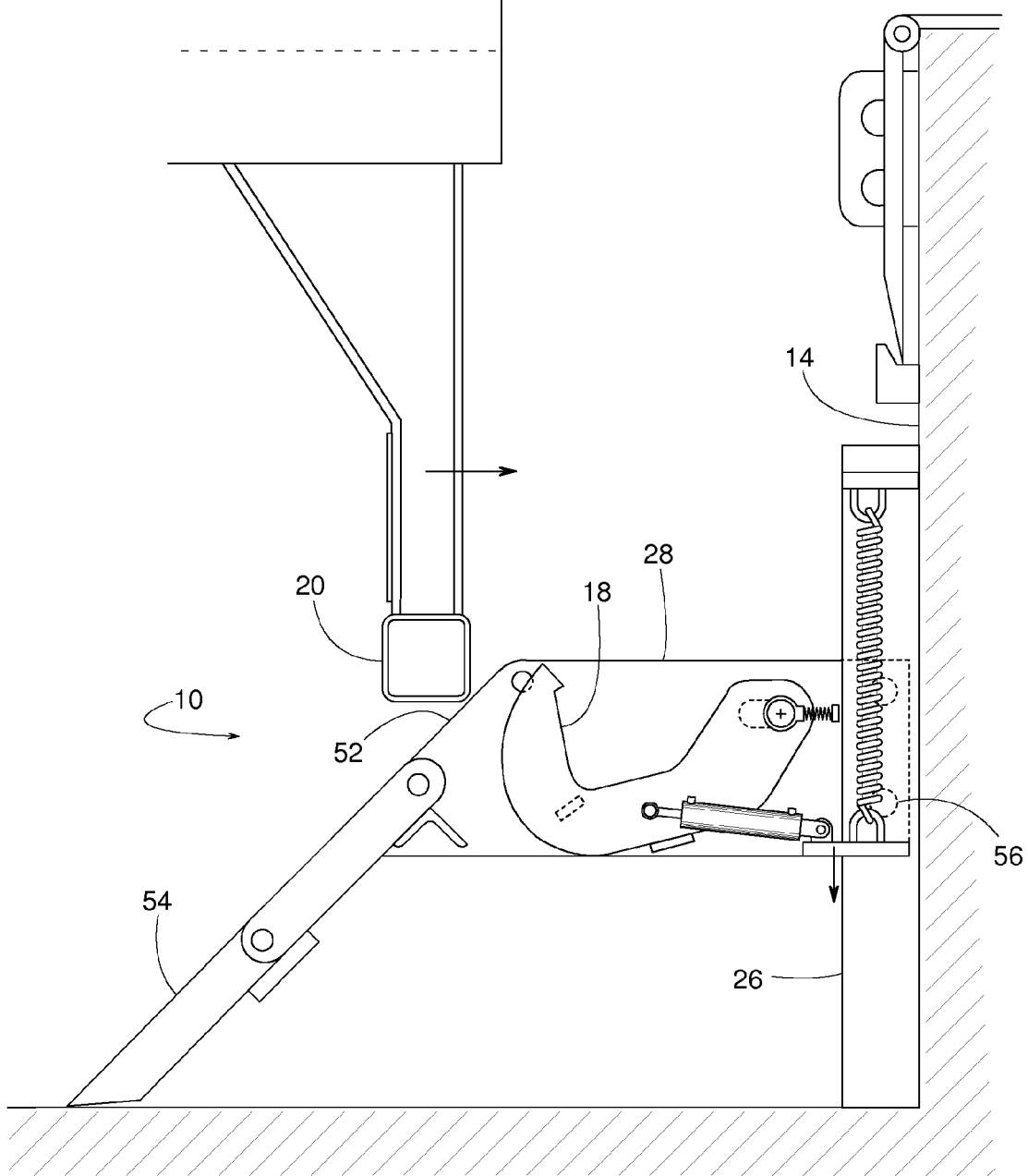
FIG. 2 is a side view similar to FIG. 1, but showing the vehicle engaging the example vehicle restraint.

Next, FIG. 2 shows vehicle 12 continuing to move back toward dock face 14. Upon doing so, RIG 20 forces the vehicle restraint's main body 28 downward by RIG 20 sliding along a ramp portion 52 of main body 28. In cases where RIG 20 is exceptionally low, an articulated lead-in ramp extension 54 is used in some examples to guide RIG 20 onto ramp 52. In this example, a set of rollers 56 on main body 28 and extending into track 26 reduces (e.g., minimizes) friction as main body 28 travels vertically along track 26. As RIG 20 pushes main body 28 down, as shown in FIG. 2, barrier 18 remains in its stored position.

Referring to FIG. 3, after RIG 20 pushes main body 28 down to a lowered operative elevation or position (FIGS. 3-5) and after the vehicle 12 moves the RIG 20 sufficiently close to dock face 14, actuator 38 is energized or extends. Actuator 38 extends to rotate barrier 18 upward from its stored position (FIG. 2) to its upper blocking position (FIG. 3) (e.g., in an upward or clockwise direction in the orientation of FIGS. 2 and 3). With spring 48 holding shaft 32 to the right end of slot 46, barrier 18 rotates about a first axis 58 so that an upper end 60 of barrier 18 travels along a predetermined non-obstructed path 62. In some examples, the predetermined non-obstructed path 62 is circular with axis 58 being its center point. The predetermined non-obstructed path 62 allows barrier 18 to rotate or rise without stop 36 blocking the upward movement of striker 34. With barrier 18 at its upper blocking position, vehicle restraint 10 is now restraining vehicle 12 at dock 16, so dock leveler 22 can be deployed as shown in FIG. 3.

If, while still being restrained, vehicle 12 moves forward away from dock face 14, RIG 20 might exert sufficient force 64 (FIG. 3) to push barrier 18 a limited distance forward and/or down to an intermediate blocking position, shown in FIG. 4. Barrier 18 may be configured to be yieldable in the rotational direction to protect the actuator 42 and/or its related components from, for example, damage. In reaction to RIG 20 pushing barrier 18 forward away from dock face 14, shaft 32 translates from the right end to the left end of slot 46, as viewed in FIG. 4. Shaft 32 engaging the far left end of slot 46 limits the barrier's forward movement to that point. The limited forward movement, however, is sufficient to displace the upper end 60 of barrier 18 from the predetermined non-obstructed path 62 to an obstructed path 66. Paths 62 and 66, for example, are represented by the circular or arcuate lines traced by the barrier's distal end as the barrier rotates along the respective paths 62 and 66. In some examples, certain sections of paths 62 and 66 overlap each other. In the illustrated example, the non-obstructed path 62 provides an arcuate profile having an axis of rotation defined by axis 58 and obstructed path 66 provides an arcuate path having an axis of rotation defined by axis 68. Thus, the barrier 18 moves in both rotation and translation (e.g., lateral or horizontal translation) relative to the main body 28.

Once barrier 18 is displaced from path 62 to path 66, if RIG 20 continues pushing against barrier 18 with sufficient force 64, barrier 18 will rotate downward along obstructed path 66 instead of non-obstructed path 62 to direct striker 34 toward stop 36. In some examples, obstructed path 66 is circular with an axis 68 being its center point.

Downward rotation along obstructed path 66, in some examples, continues until the lower surface of striker 34 engages the upper surface of stop 36, as shown in FIG. 4A. Solid mechanical engagement between striker 34 and stop 36 prevents RIG 20 from pushing barrier 18 lower than or beyond the intermediate blocking position shown in FIG. 4. Striker 34 engages stop 36 to provide barrier 18 with a much greater resistive force 70 to resist the forward push of vehicle 12 than the force barrier 18 could otherwise exert under the support of actuator 38 alone (e.g., without excessive pressure building within the hydraulic cylinder or excessive force being applied actuator 38).

In examples where barrier 18 exerts less holding force (opposing force 64) in the upper blocking position than in the intermediate blocking position, the reduced holding force can be particularly beneficial when the supporting structure of RIG 20 includes a relatively lightweight plate 72. When barrier 18 is at its upper blocking position, as shown in FIG. 3, a tip of barrier 18 might engage a relatively weak portion of plate 72. Barrier 18 exerting significant pressure or force (e.g., a maximum force) at this point might damage plate 72. Thus, it might be beneficial to limit the barrier's holding force at the barrier's upper blocking position. However, if the barrier's holding force is too small throughout its range of blocking positions, vehicle 12 might forcibly release itself completely from vehicle restraint 10. To prevent forcible release of the vehicle, striker 34 engages stop 36 to allow barrier 18 to exert substantial resistive force 70 at the barrier's intermediate blocking position, as shown in FIG. 4. Also, barrier 18 at the intermediate blocking position, in some cases, engages lower areas of plate 72 and/or other areas of RIG 20 where RIG 20 can withstand relatively greater amounts of force.

Figure 5:
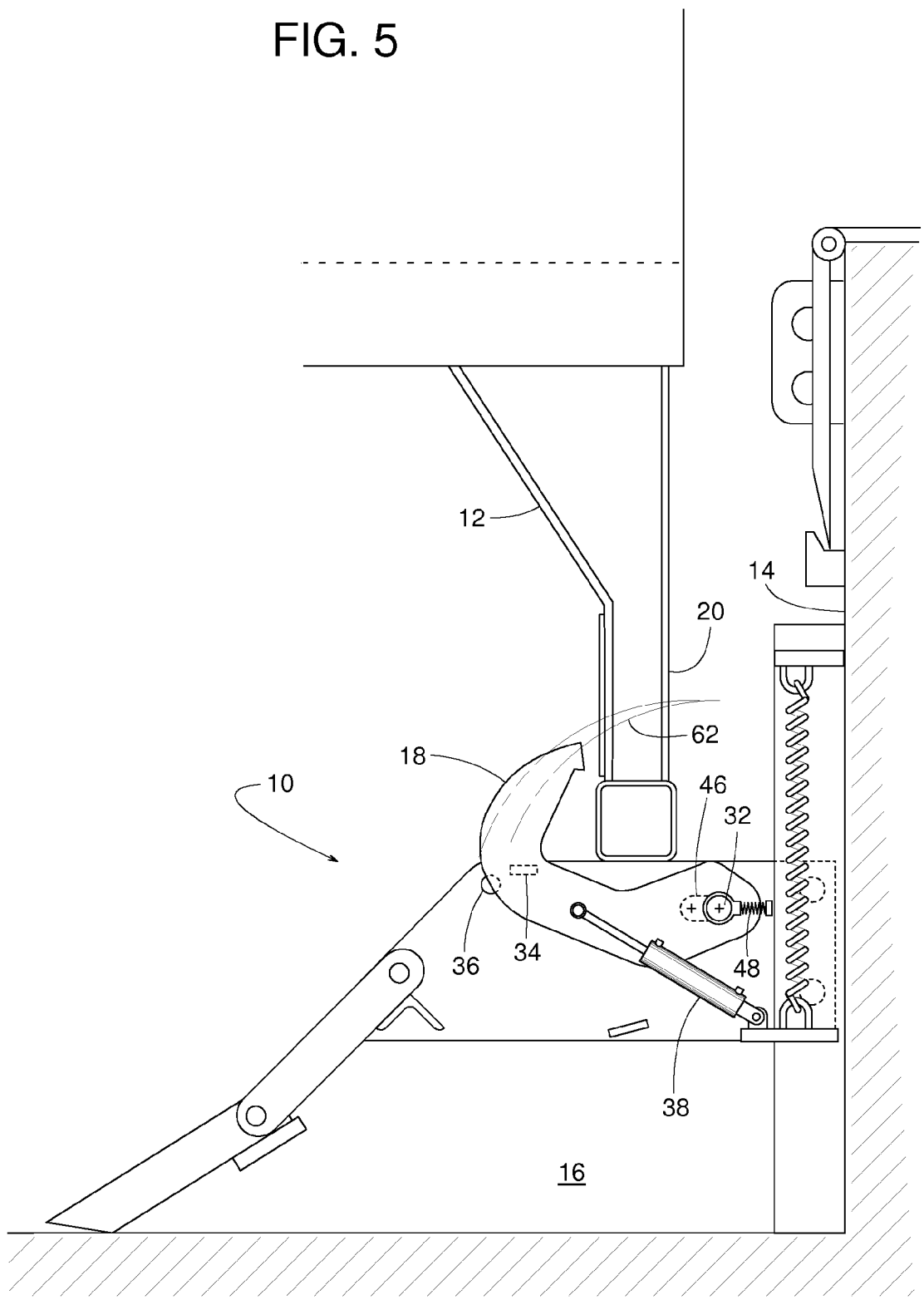
FIG. 5 is a side view similar to FIG. 4, but showing the example vehicle restraint moving to release the vehicle.

Referring to FIG. 5, to release vehicle 12 from the condition shown in FIG. 4, vehicle 12 moves back toward dock face 14 and actuator 38 retracts. This allows spring 48 to pull shaft 32 to the right end of slot 46 so that barrier 18 rotates along the predetermined non-obstructed path 62. With barrier 18 on the predetermined non-obstructed path 62, striker 34 disengages stop 36 to enable actuator 38 to lower barrier 18 to its stored position, thereby releasing RIG 20 and allowing vehicle 12 to depart dock 16.

FIGS. 6-11 illustrate another example vehicle restraint 74 disclosed herein. Those components of the vehicle restraint 74 that are similar or identical in structure to the components of the example vehicle restraint 10 of FIGS. 1-5 and that have functions substantially similar or identical to the functions of those components will not be described in detail again below. Instead, the interested reader is referred to the above corresponding descriptions. Similar or like components are identified with the same reference numbers. Referring to FIGS. 6-11, a vehicle restraint 74 includes a spring loaded stop member 76, which eliminates the need for spring 48 of vehicle restraint 10. Vehicle restraint 74 also includes a striker member 78 to selectively engage and disengage stop 76, where striker 78 and stop 76 of vehicle restraint 74 correspond to striker 34 and stop 36 of vehicle restraint 10.

Figure 6:
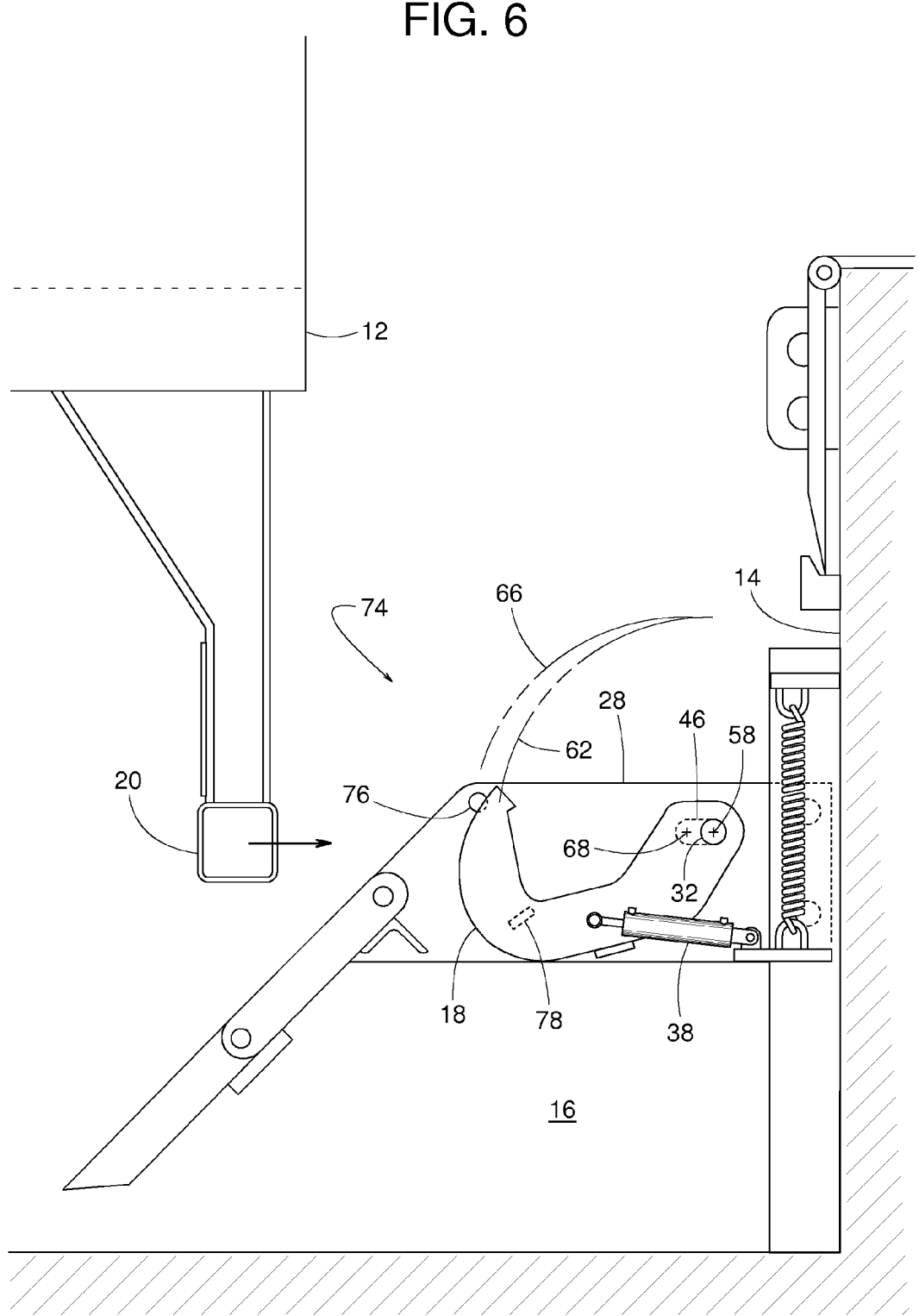
FIG. 6 is a side view of another example vehicle restraint constructed according to the teachings disclosed herein, wherein a vehicle is shown approaching the example vehicle restraint.
Figure 7:
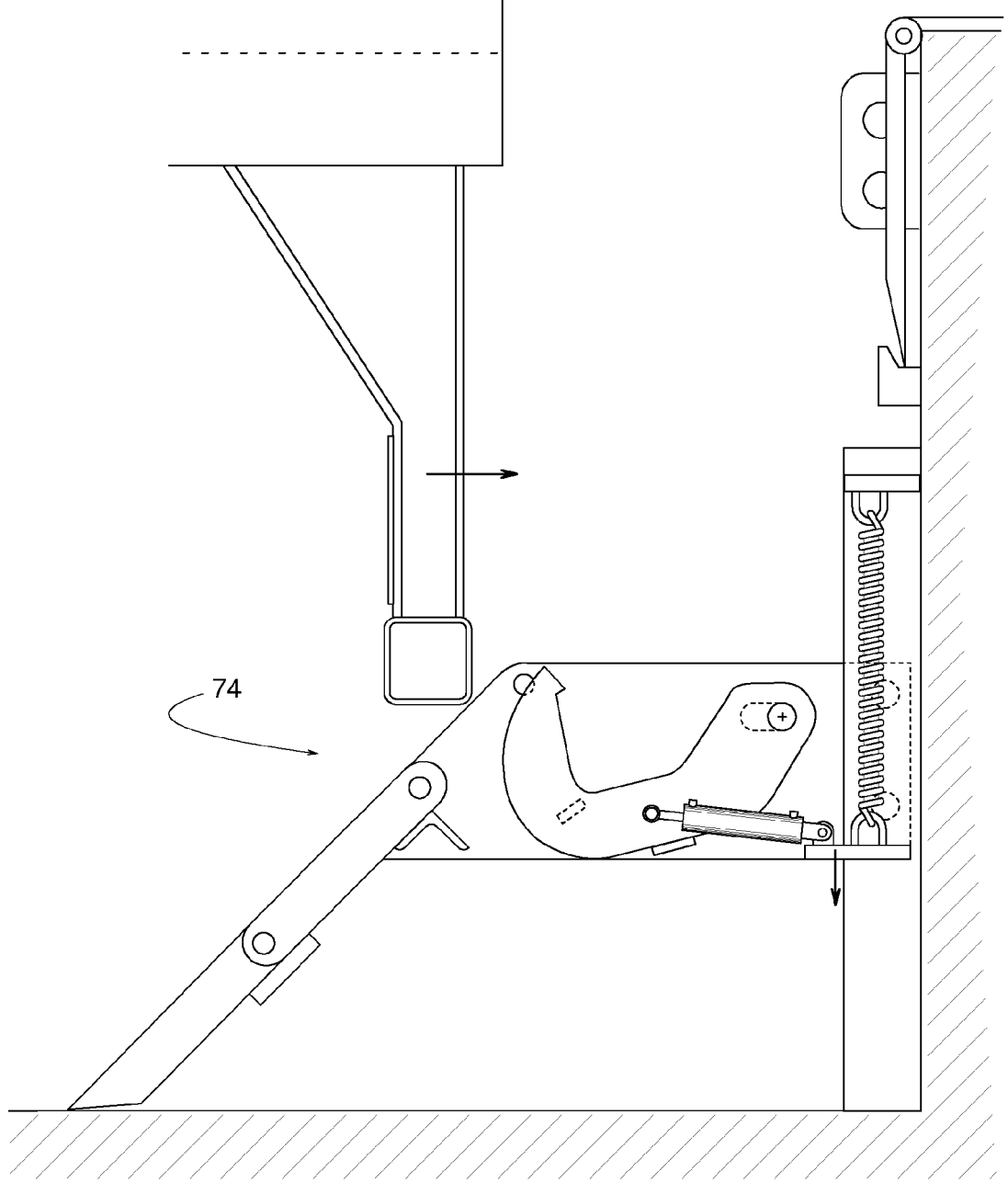
FIG. 7 is a side view similar to FIG. 6, but showing the vehicle engaging the vehicle restraint.

One operation example of vehicle restraint 74 follows the sequence of FIGS. 6-11. FIG. 6 shows vehicle 12 backing into dock 16 and approaching vehicle restraint 74. At this point, FIG. 6 shows vehicle restraint 74 functioning in the same manner as vehicle restraint 10 shown in FIG. 1. Likewise, FIG. 7 shows vehicle restraint 74 functioning in the same manner as vehicle restraint 10 shown in FIG. 2.

Figure 9:
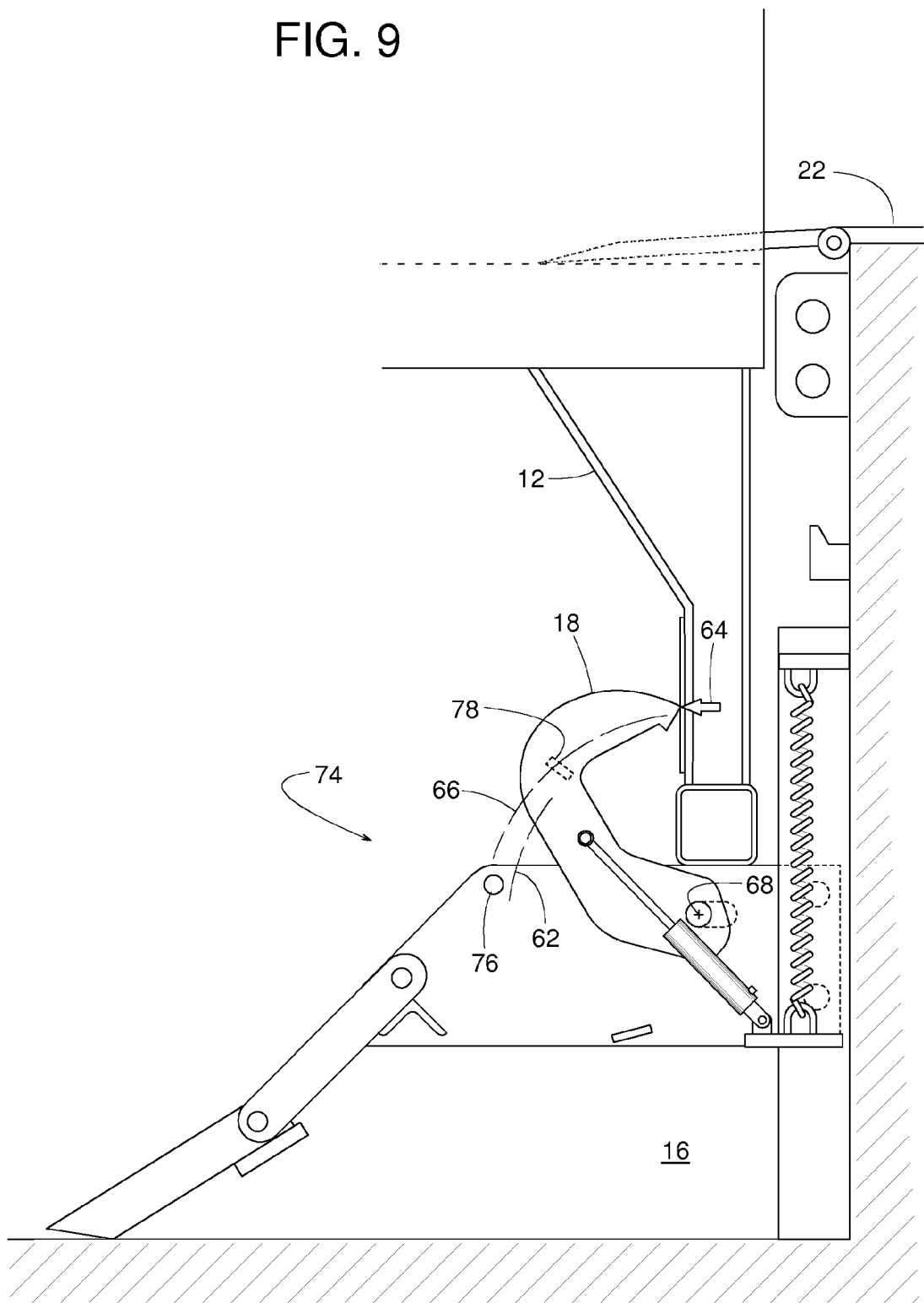
FIG. 9 is a side view similar to FIG. 8, but showing the example barrier engaging the vehicle.

Referring to FIGS. 8, 8A and 8B, after RIG 20 pushes main body 28 down to a lowered operative elevation or position (FIGS. 8-11), and after vehicle 12 moves its RIG 20 sufficiently close to dock face 14, actuator 38 extends to rotate barrier 18 upward from its stored position (FIG. 7), through an intermediate position (FIGS. 8 and 8A), and up to its upper blocking position (FIG. 9). Without spring 48 holding shaft 32 to the right end of slot 46 as shown in the example vehicle restraint 10 of FIGS. 1-5, partial extension of actuator 38 positions or pushes barrier 18 to travel along obstructed path 66. Further extension (e.g., full extension) of actuator 38 rotates barrier 18 about second axis 68 so that upper end 60 of barrier 18 travels along obstructed path 66.

With barrier 18 rotating upward along obstructed path 66, striker 78 on barrier 18 engages a beveled surface 80 of stop 76. Stop 76 is movable and spring loaded to allow stop 76 to retract out from within the path of striker 78 to allow striker 78 to travel upward past stop 76 as shown in FIGS. 8A and 8B. FIG. 8A shows striker 78 approaching stop 76, and FIG. 8B shows striker 78 traveling past stop 76.

In some examples, a leaf spring 82 attached to stop 76 and main body 28 biases stop 76 toward barrier 18 in a direction 84 generally parallel to axis 68, which is generally perpendicular to paths 62 and 66. Each stop 76 moves or slides axially in a hole 86 through main body 28 so that striker 78 pushes stop 76 aside or out of the obstructed travel path 66 as striker 78 travels upward past stop 76. When striker 78 is past stop 76, spring 82 pushes stop 76 from its position shown in FIG. 8B to its position shown in FIG. 8A back into the obstructed travel path 66.

Alternatively or in addition to stop 76 being spring loaded, in some examples, striker 78 is axially movable and spring loaded to provide an equivalent function as the example illustrated in FIGS. 8A and 8B. In any case, Striker 78 and/or stop 76 being axially movable and spring loaded allows barrier 18 to rise or rotate to the upper blocking position without stop 76 blocking the upward movement of striker 78 even though barrier 18 is rotating upward along obstructed path 66. When barrier 18 at its upper blocking position, as shown in FIG. 9, vehicle restraint 74 restrains vehicle 12 at dock 16, so dock leveler 22 can be deployed.

Figure 10:
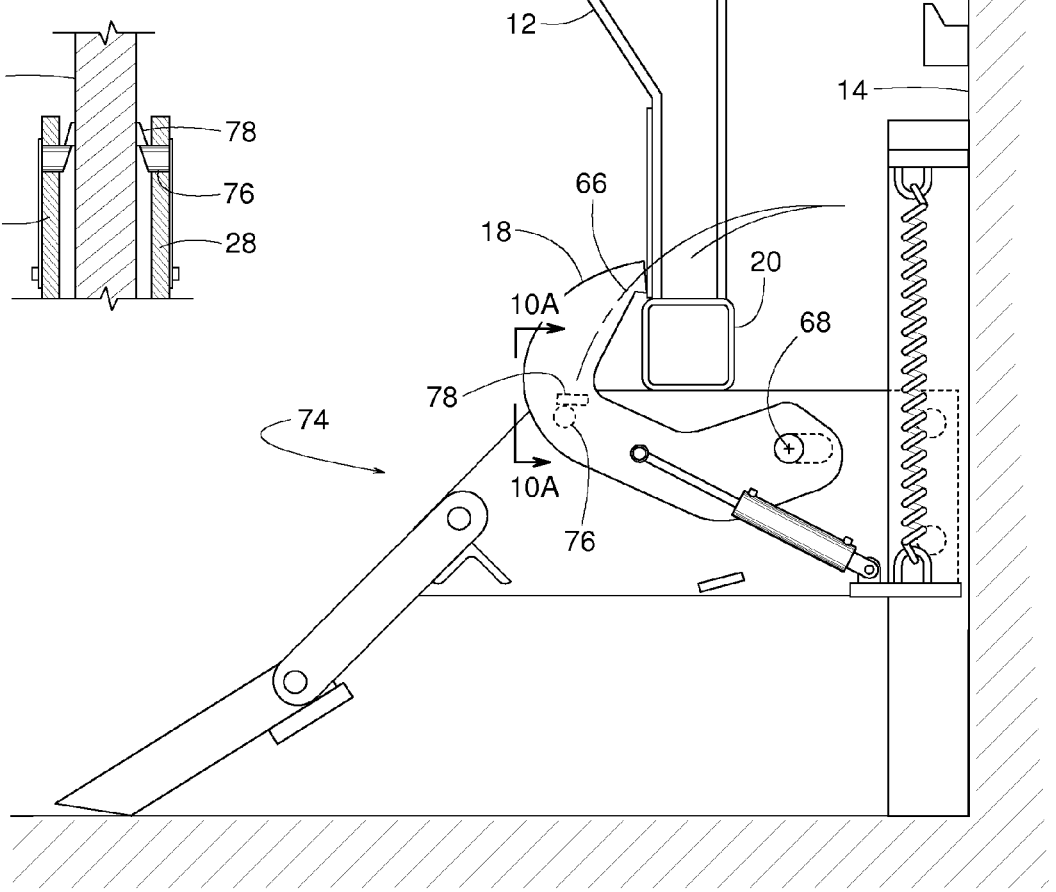
FIG. 10 is a side view similar to FIG. 9, but showing the vehicle having pushed the example barrier to an example intermediate blocking position.

If, while still being restrained, vehicle 12 moves forward away from dock face 14, RIG 20 might exert sufficient force 64 to push barrier 18 down to the intermediate blocking position shown in FIG. 10. Without spring 48 (FIGS. 1-5), barrier 18 rotates about axis 68 in a downward direction (e.g., a counterclockwise direction) along obstructed path 66, which directs striker 78 toward stop 76. In some examples, obstructed path 66 is circular with axis 68 being its center point.

Figure 10A:
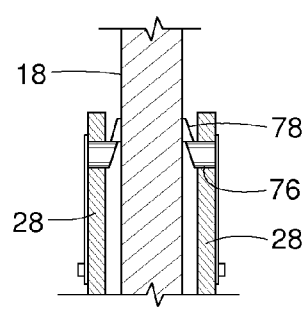
FIG. 10A is a cross-sectional end view taken along line 10A-10A of FIG. 10.

Downward rotation along obstructed path 66, in some examples, continues until the lower surface of striker 78 engages the upper surface of stop 76, as shown in FIGS. 10 and 10A. Solid mechanical engagement between striker 78 and stop 76 prevents RIG 20 from pushing barrier 18 below or beyond (e.g., lower than) the intermediate blocking position shown in FIG. 10. In particular, as shown in FIG. 10A, because striker 78 engages a shoulder or non-beveled or non-tapered surface of stop 76, striker 78 does not bias or move stop 76 outside of the obstructed travel path 66 when striker 78 moves downward into engagement with stop 76.

Figure 11:
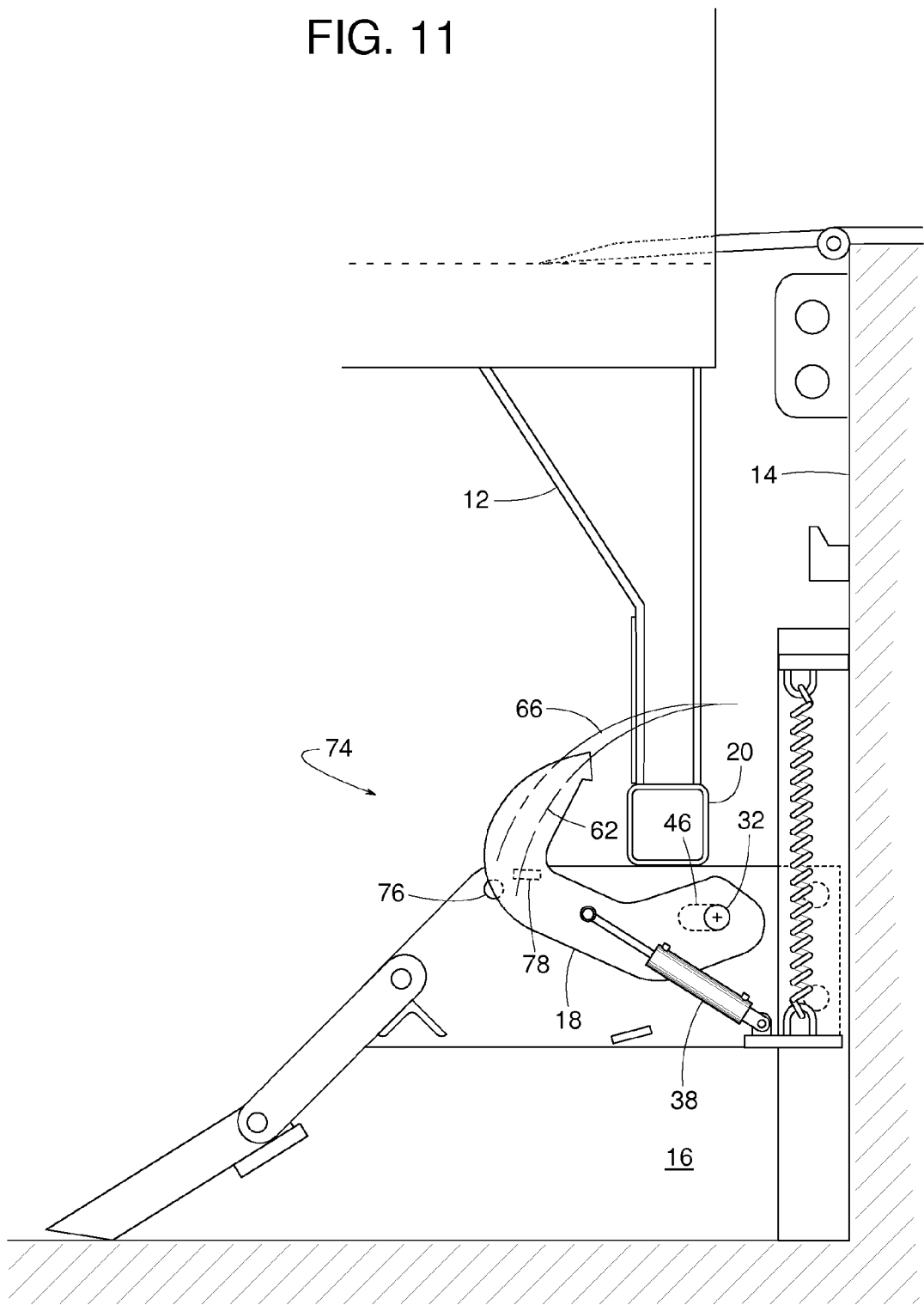
FIG. 11 is a side view similar to FIG. 10 but showing the example vehicle restraint moving to release the vehicle.

Referring to FIG. 11, to release vehicle 12 from the condition shown in FIG. 10, vehicle 12 moves back toward dock face 14 and actuator 38 retracts. Actuator 38 retracting causes or pulls shaft 32 to move to the right end of slot 46 so that barrier 18 is on the predetermined non-obstructed path 62 and barrier 18 rotates about axis 58. With barrier 18 on the predetermined non-obstructed path 62, striker 78 disengages stop 76 so actuator 38 can lower barrier 18 to its stored position, thereby releasing RIG 20 and thus allowing vehicle 12 to depart dock 16.

FIGS. 12-17 illustrate another example vehicle restraint 88 disclosed herein. Those components of the vehicle restraint 88 that are similar or identical in structure to the components of the example vehicle restraint 10 of FIGS. 1-5 and that have functions substantially similar or identical to the functions of those components will not be described in detail again below. Instead, the interested reader is referred to the above corresponding descriptions. Similar or like components are identified with the same reference numbers. Referring to FIGS. 12-17, a vehicle restraint 88 includes a stop member 90 in the form of a roller attached to main body 28, which eliminates the need for spring 48 of vehicle restraint 10 and spring 82 of vehicle restraint 74. Vehicle restraint 88 also includes a striker member 91 in the form of a notch in a barrier 92. Striker 91 selectively engages and disengages stop 90, where striker 91 corresponds to strikers 34 and 78, and stop 90 corresponds to stops 36 and 76.

Figure 12:
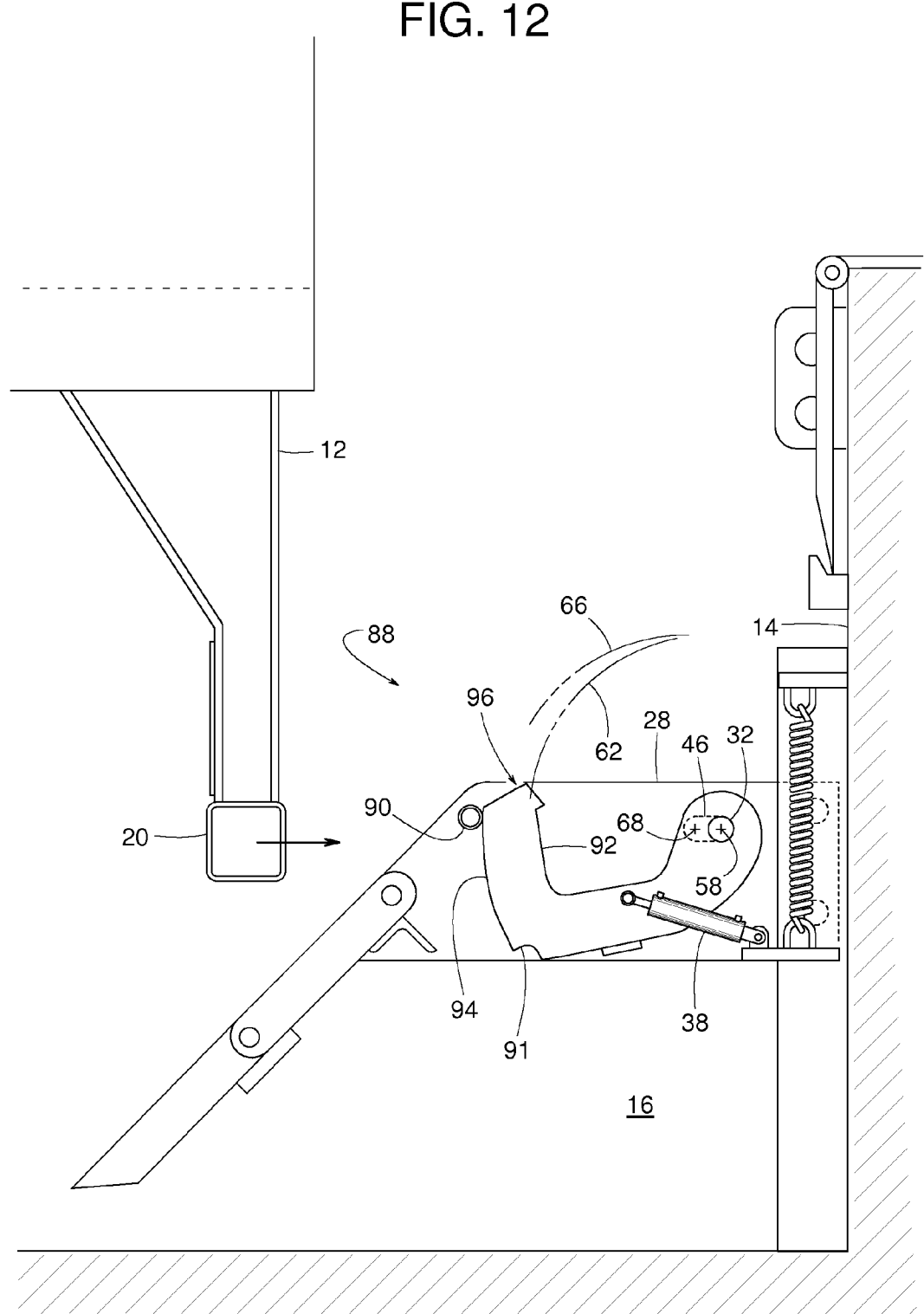
FIG. 12 is a side view of another example vehicle restraint constructed according to the teachings disclosed herein, wherein a vehicle is shown approaching the example vehicle restraint.
Figure 13:
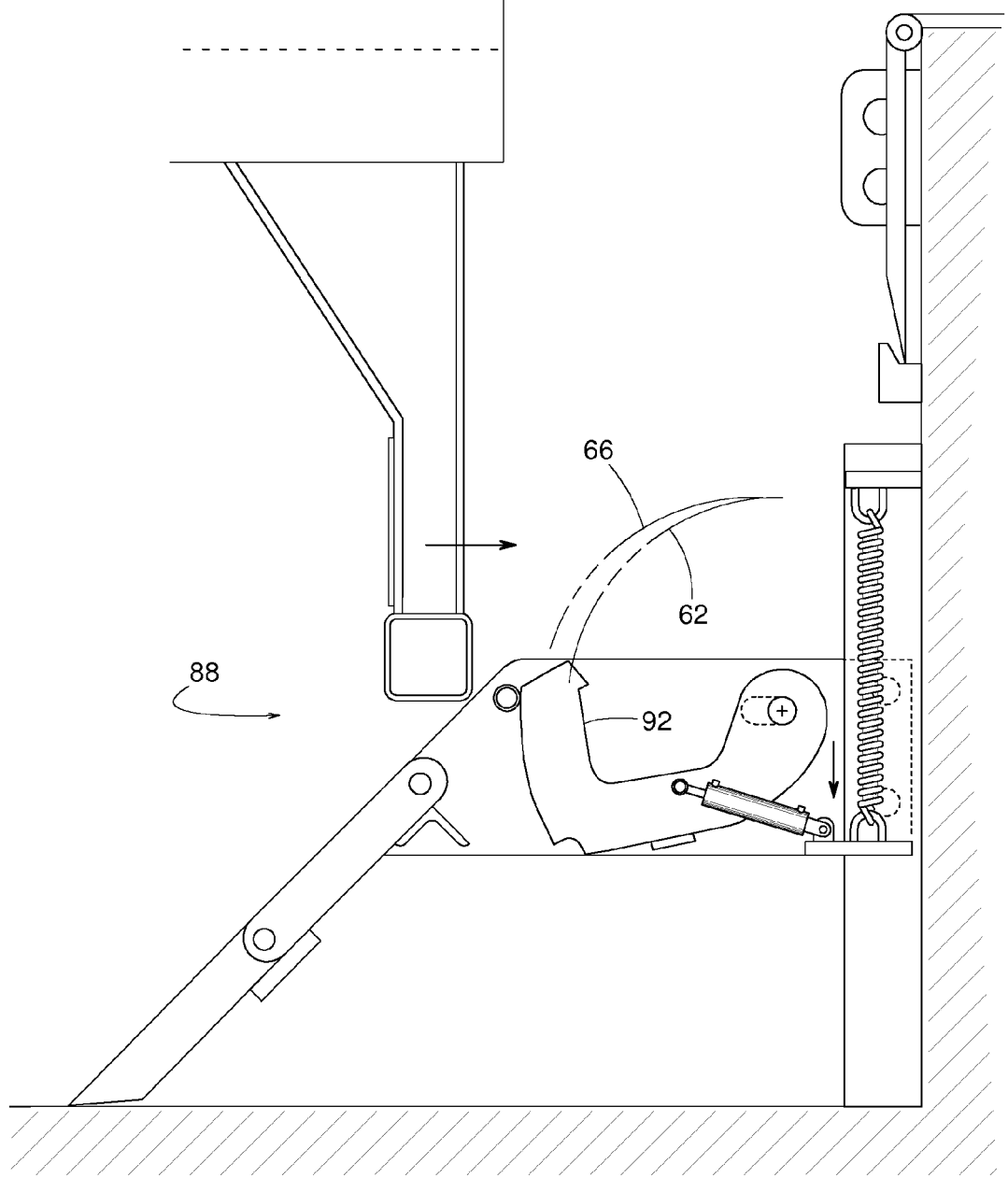
FIG. 13 is a side view similar to FIG. 12, but showing the vehicle engaging the vehicle restraint.

An example operation of vehicle restraint 88 follows the sequence of FIGS. 12-17. FIG. 12 shows vehicle 12 backing into dock 16 and approaching vehicle restraint 88. At this point, FIG. 12 shows vehicle restraint 88 functioning in a similar manner as the vehicle restraints shown in FIGS. 1 and 6. Likewise, FIG. 13 shows vehicle restraint 88 functioning in a similar manner as the vehicle restraints shown in FIGS. 2 and 7.

Figure 14:
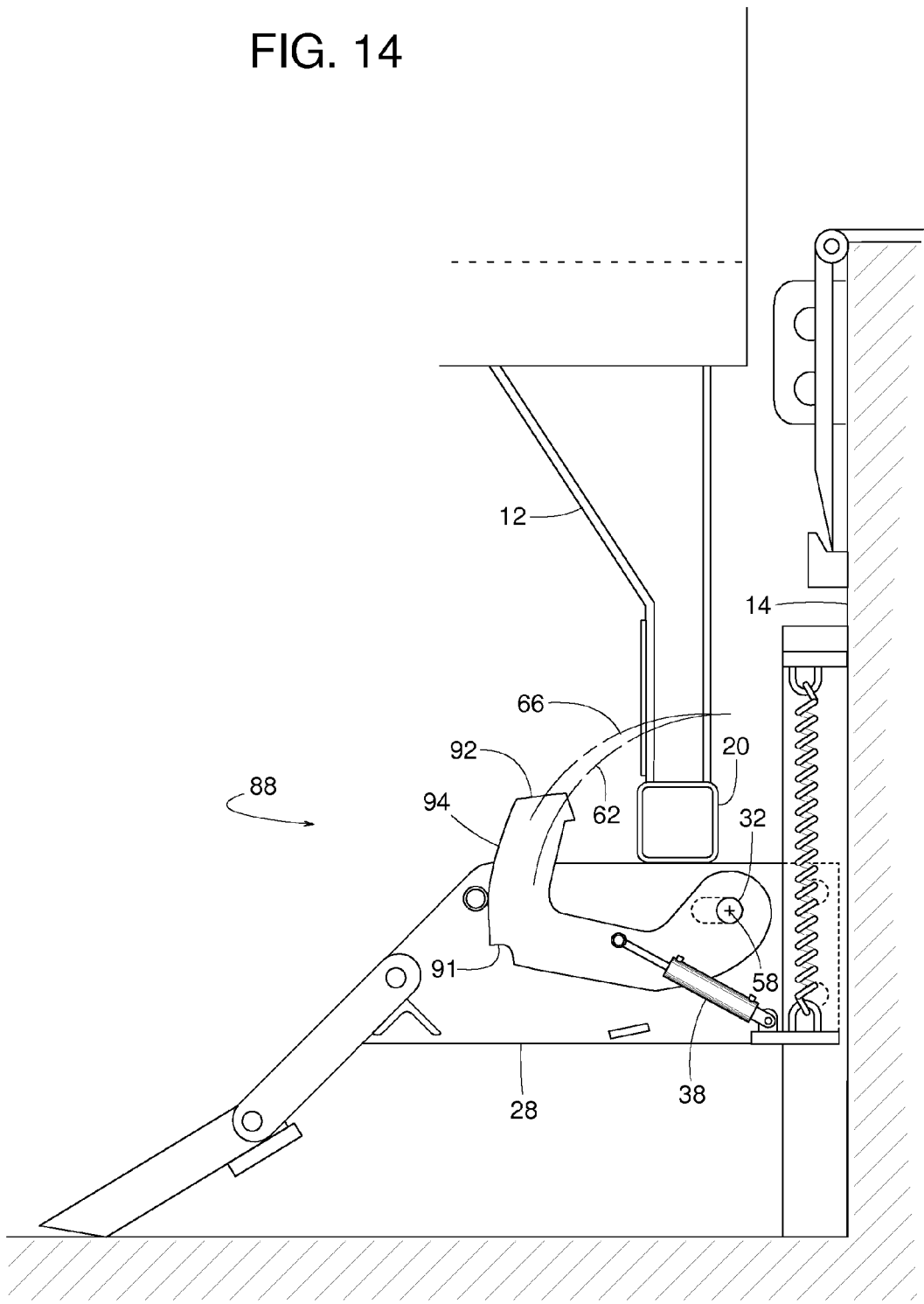
FIG. 14 is a side view similar to FIGS. 12 and 13, but showing an example barrier of the vehicle restraint of FIGS. 12 and 13 rising to block the vehicle.
Figure 15:
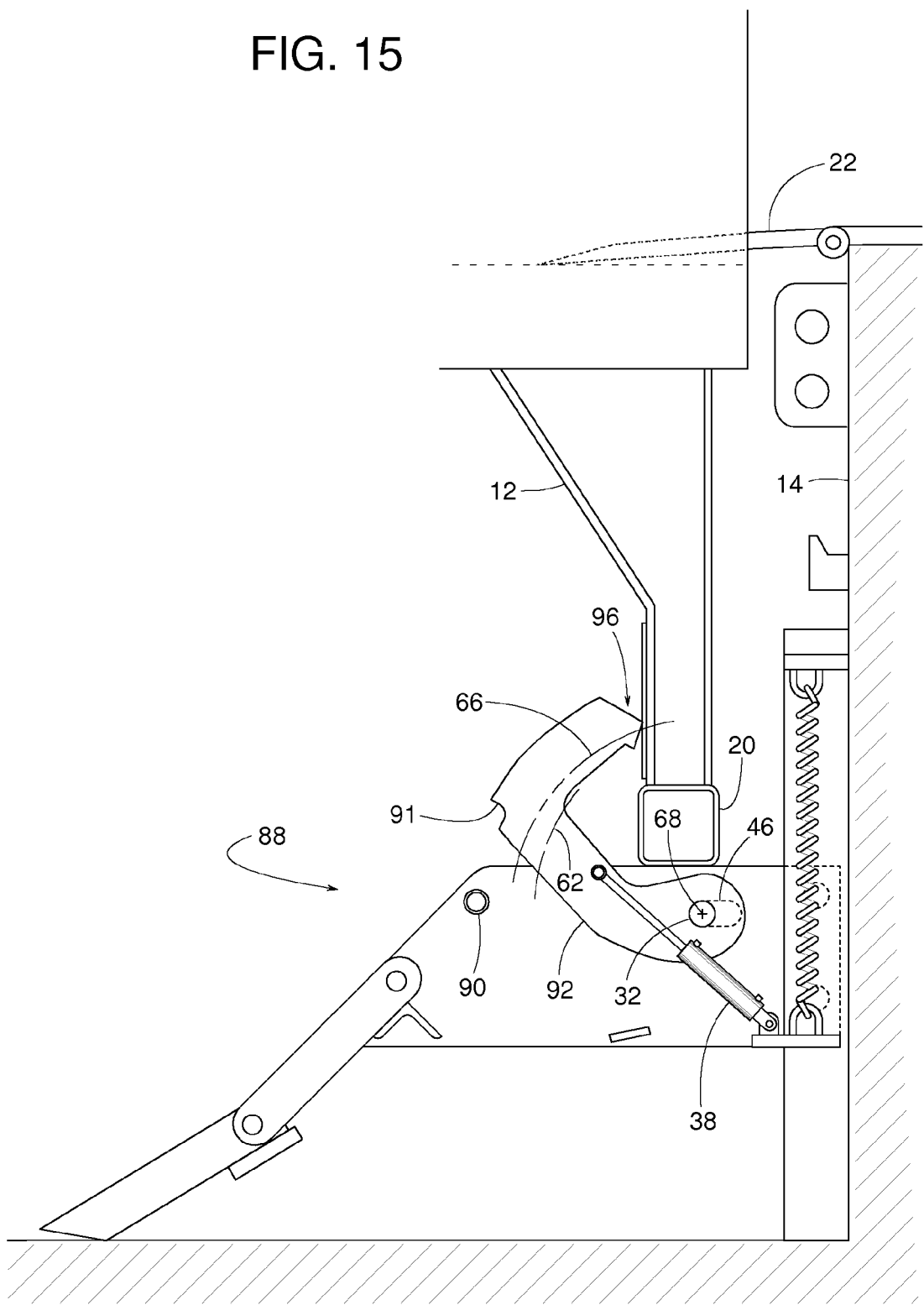
FIG. 15 is a side view similar to FIG. 14, but showing the example barrier engaging the vehicle.

Referring to FIGS. 14 and 15, after RIG 20 pushes main body 28 down to a lowered operative elevation or position (FIGS. 14-17), and after vehicle 12 moves its RIG 20 sufficiently close to dock face 14, actuator 38 extends. Actuator 38 extends to rotate barrier 92 upward from its stored position (FIG. 13), through an intermediate position (FIG. 14), and up to its upper blocking position (FIG. 15). Instead of spring 48 as shown in FIGS. 1-5, roller 90 engages a cam edge 94 on barrier 92 to hold shaft 32 to the right end of slot 46. In other words, the interaction between the stop 90 and the cam edge 94 positions the shaft 32 of barrier 92 in the slot 46 between the axes 58 and 68. Thus, actuator 38 extends to rotate barrier 92 about first axis 58 upward along the predetermined non-obstructed path 62 until striker 91 rises above stop 90. Once striker 91 is above stop 90, further extension of actuator 38 moves barrier 92 from the predetermined non-obstructed path 62 to the obstructed path 66 due to shaft 32 being free to translate from the right to left end of slot 46 and disengagement of the cam edge 94 relative to the stop 90. With shaft 32 at the left end of slot 46, further extension of actuator 38 rotates barrier 92 about second axis 68 so that an upper end 96 of barrier 92 travels along obstructed path 66 to the upper blocking position shown in FIG. 15. At this point, vehicle 12 is restrained, and dock leveler 22 can be deployed.

Figure 16:
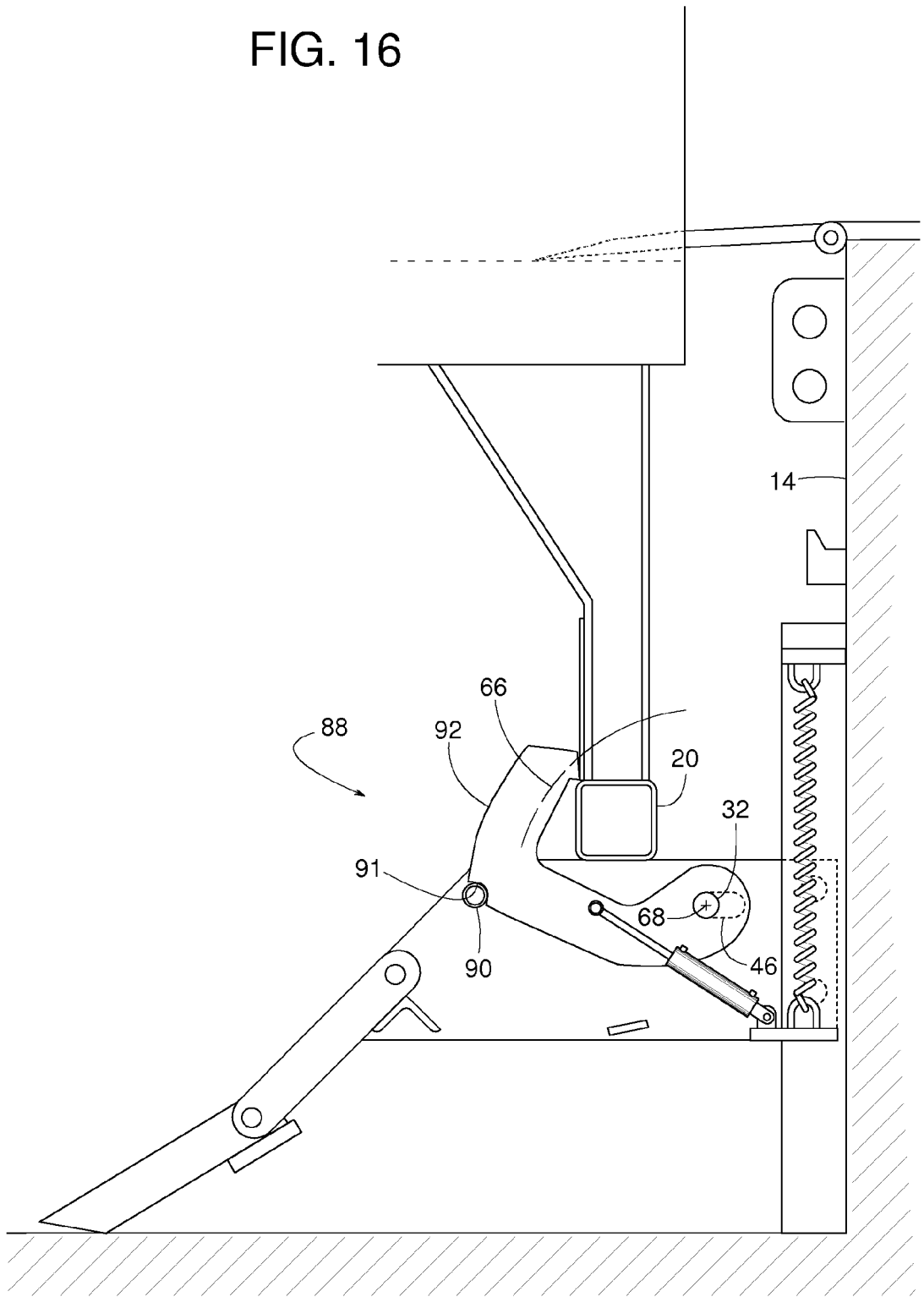
FIG. 16 is a side view similar to FIG. 15, but showing the vehicle having pushed the example barrier to an example intermediate blocking position.

If, while being restrained, vehicle 12 moves forward away from dock face 14, RIG 20 might exert sufficient force to push barrier 92 down to the intermediate blocking position shown in FIG. 16. At this position, the shaft 32 is not urged to the right end of slot 46, and with RIG 20 pushing barrier 92 away from dock face 14, RIG 20 forces barrier 92 to rotate about axis 68 downward along obstructed path 66, which directs striker 91 against stop 90. A mechanical engagement between striker 91 and stop 90 prevents RIG 20 from pushing barrier 92 below or beyond (e.g., lower than) the intermediate blocking position shown in FIG. 16.

Figure 17:
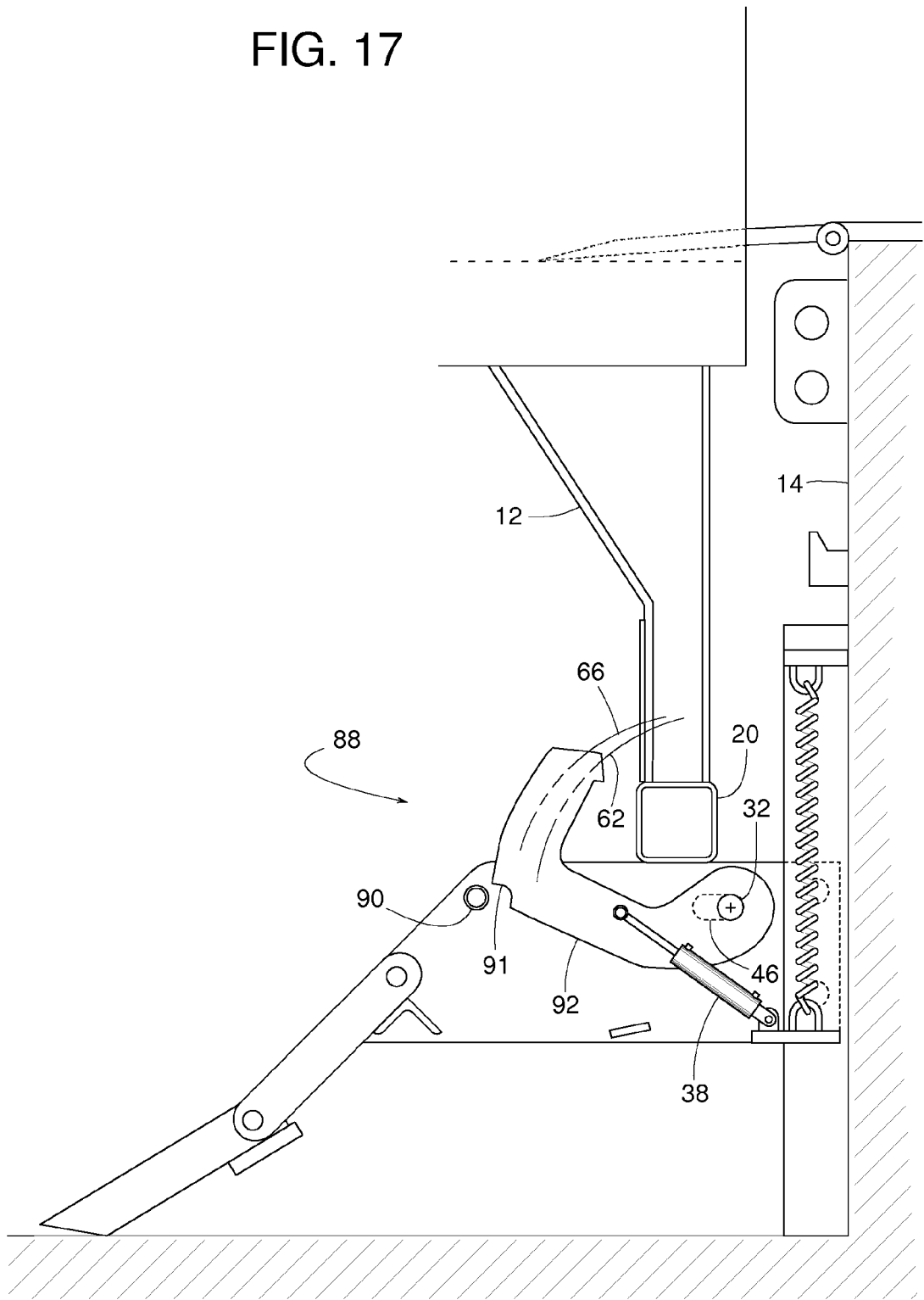
FIG. 17 is a side view similar to FIG. 16, but showing the example vehicle restraint moving to release the vehicle.

Referring to FIG. 17, to release vehicle 12 from the condition shown in FIG. 16, vehicle 12 moves back toward dock face 14 and actuator 38 retracts. Actuator 38 retracting pulls shaft 32 to the right end of slot 46 so that barrier 92 rotates about axis 58 on the predetermined non-obstructed path 62. With barrier 92 on the predetermined—non-obstructed path 62, striker 91 disengages stop 90 to enable actuator 38 to move or lower barrier 92 to its stored position, thereby releasing RIG 20 and allowing vehicle 12 to depart.

FIGS. 18-23 illustrate another example vehicle restraint 98 disclosed herein. Those components of the vehicle restraint 98 that are similar or identical in structure to the components of the example vehicle restraint 10 of FIGS. 1-5 and that have functions substantially similar or identical to the functions of those components will not be described in detail again below. Instead, the interested reader is referred to the above corresponding descriptions. Similar or like components are identified with the same reference numbers. Referring to FIGS. 18-23, a vehicle restraint 98 includes a stop member 100 in the form of block or bar attached to main body 28. Vehicle restraint 98 also includes a striker member 102 in the form of a notch in a barrier 104. Striker 102 selectively engages and disengages stop 100, where striker 102 corresponds to strikers 34, 78 and 91, and stop 100 corresponds to stops 36, 76 and 90. With vehicle restraint 98, actuator 38 is situated or positioned to eliminate the need for spring 48 of vehicle restraint 10, spring 82 of vehicle restraint 74, and the roller of stop 90 of vehicle restraint 88.

Figure 18:
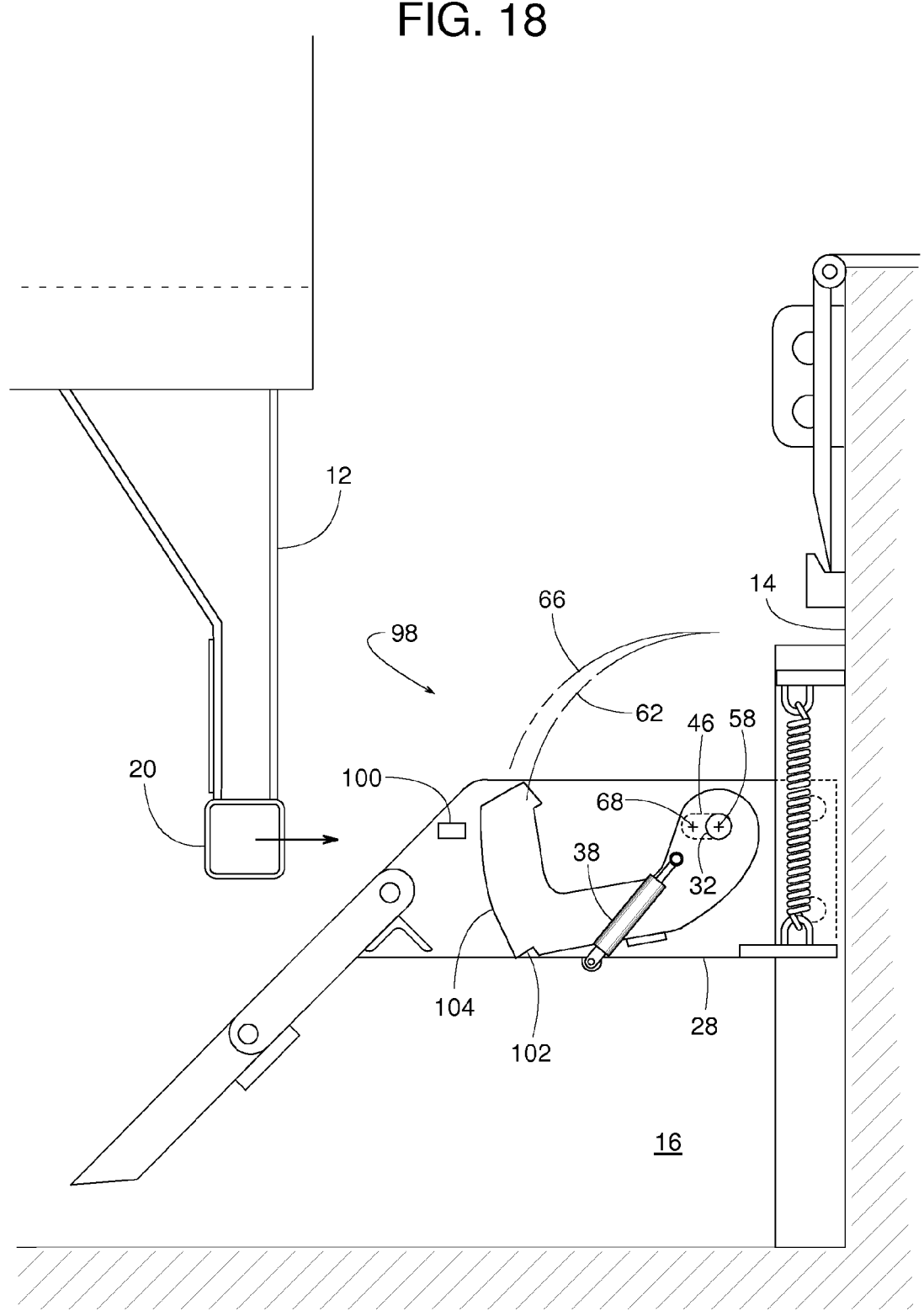
FIG. 18 is a side view of another example vehicle restraint constructed according to the teachings disclosed herein, wherein a vehicle is shown approaching the vehicle restraint.
Figure 19:
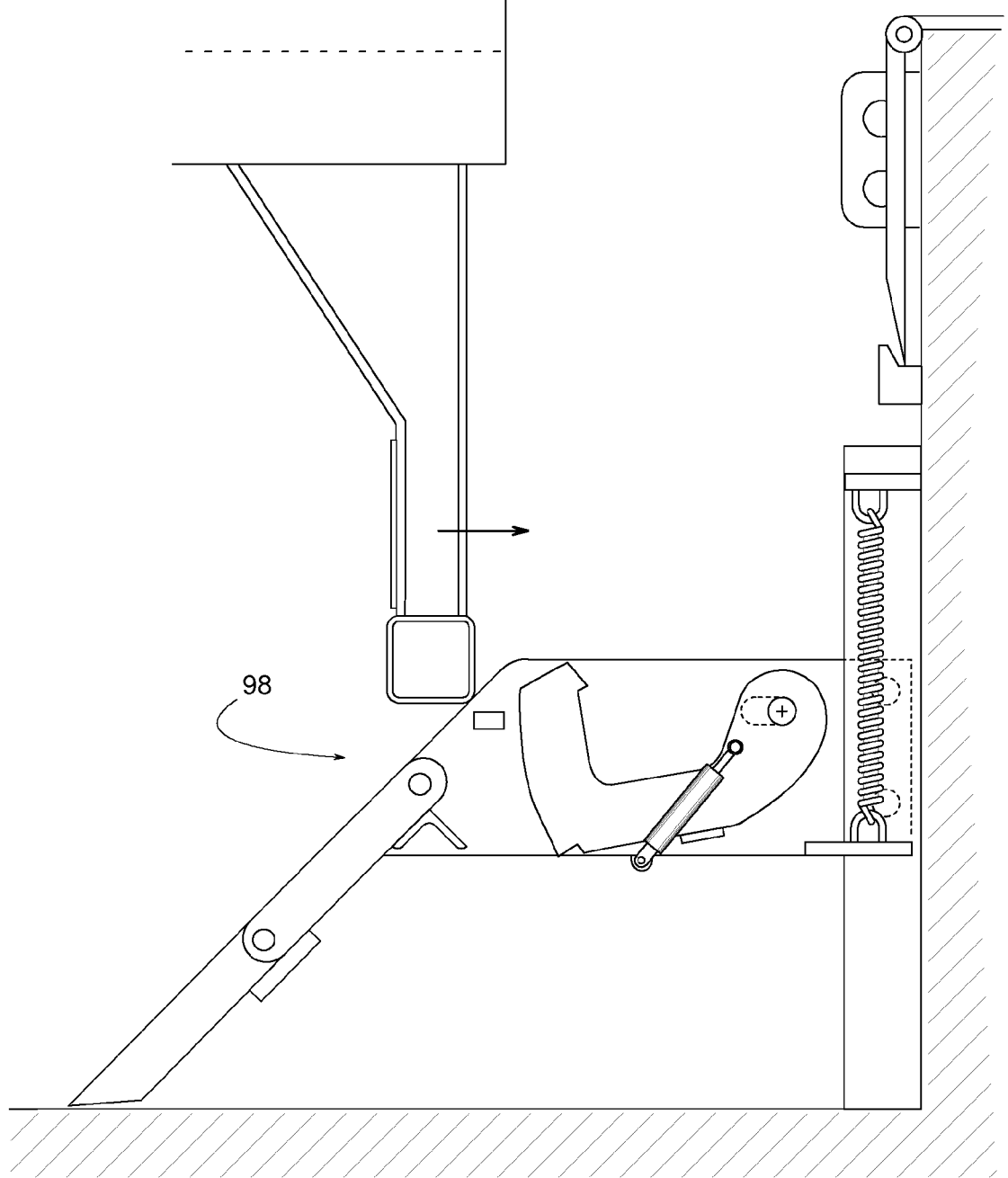
FIG. 19 is a side view similar to FIG. 18, but showing the vehicle engaging the vehicle restraint.

An example operation of vehicle restraint 98 follows the sequence of FIGS. 18-23. FIG. 18 shows vehicle 12 backing into dock 16 and approaching vehicle restraint 98. At this point, FIG. 18 shows vehicle restraint 98 functioning in a similar manner as the vehicle restraints 10, 74 and 88 shown in respective FIGS. 1, 6 and 12. Likewise, FIG. 19 shows vehicle restraint 98 functioning in a similar manner as the vehicle restraints 10, 74 and 88 shown in respective FIGS. 2, 7 and 13.

Figure 20:
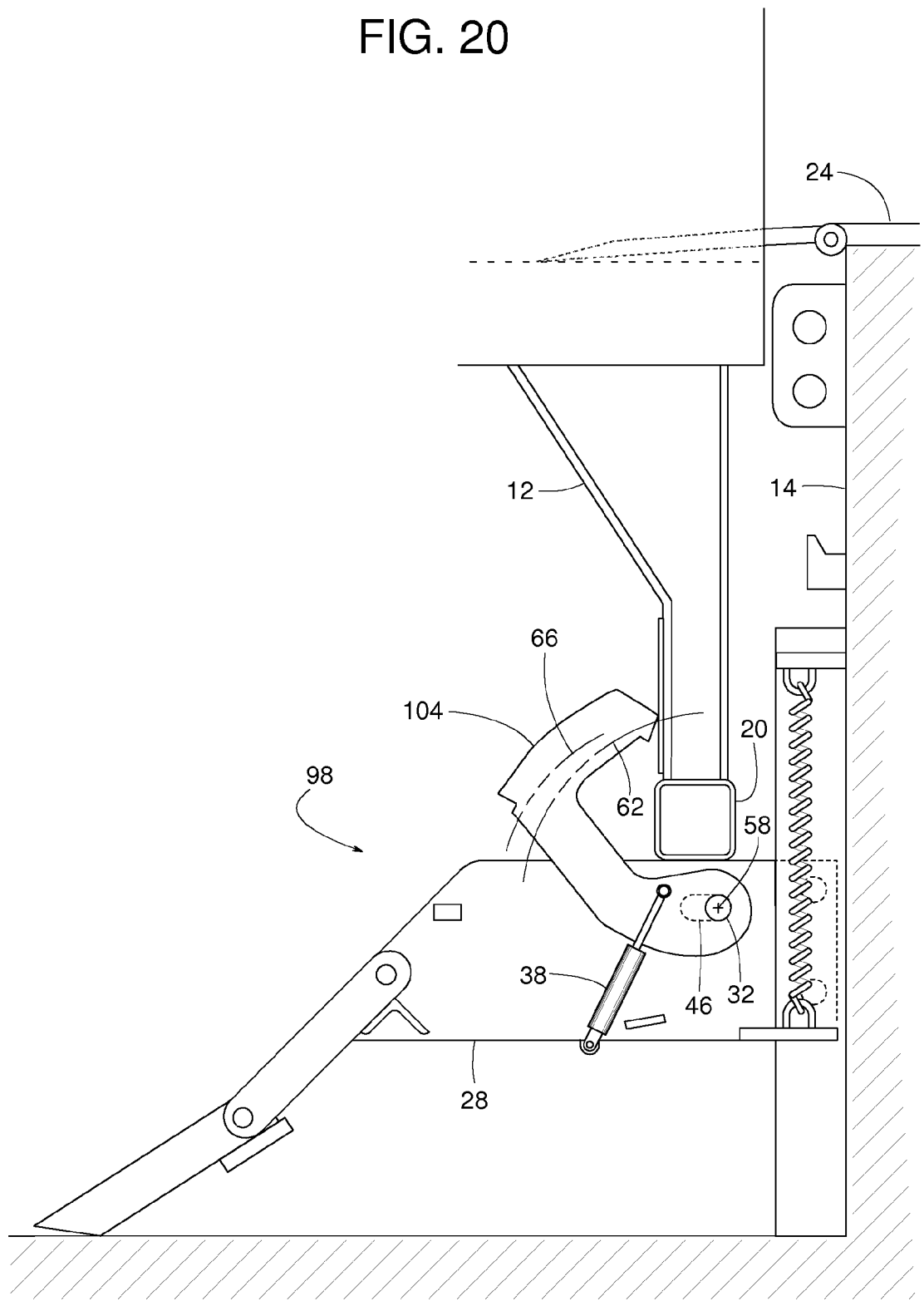
FIG. 20 is a side view similar to FIGS. 18 and 19, but showing an example barrier of the vehicle restraint of FIGS. 18 and 19 engaging the vehicle.
Figure 21:
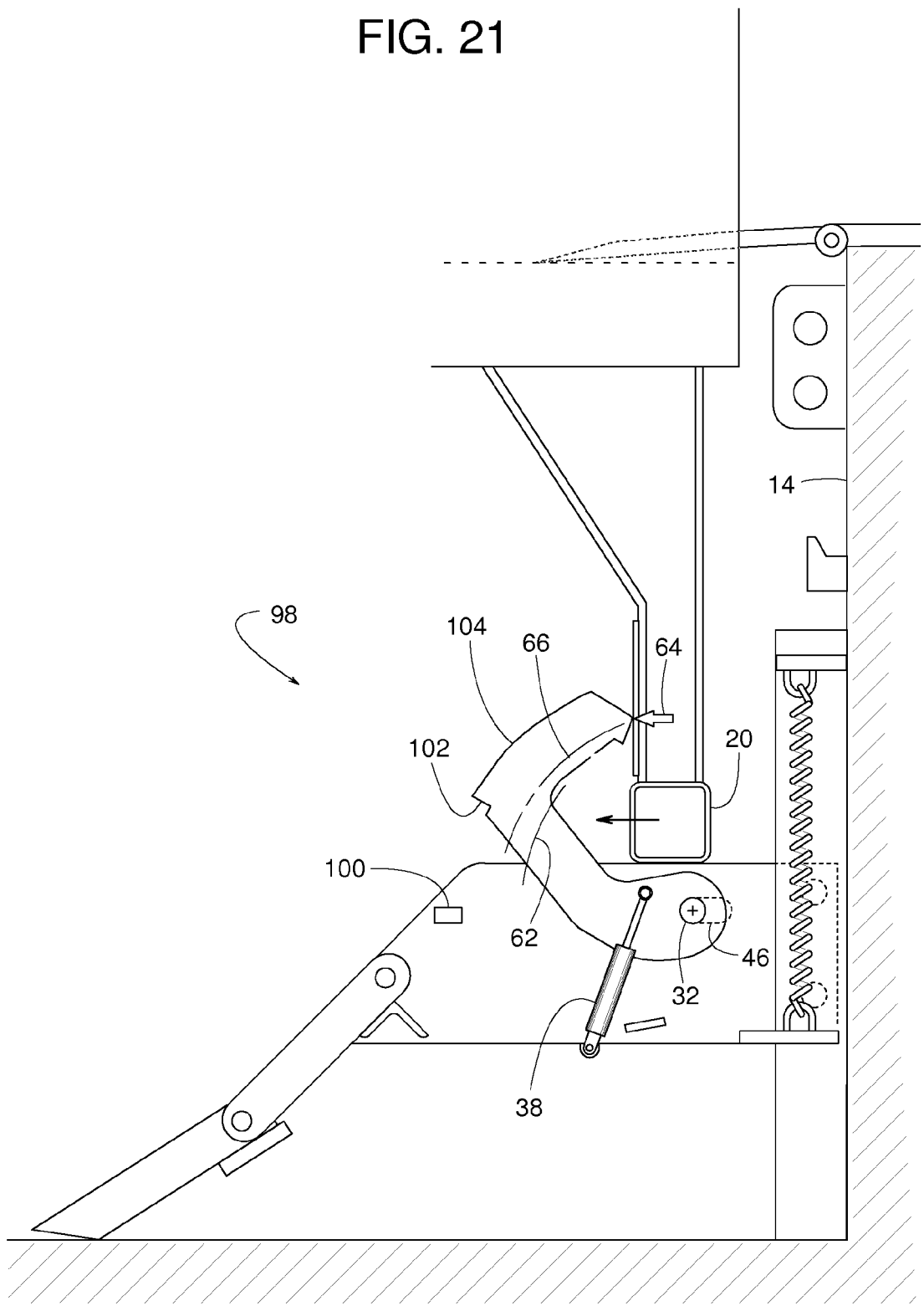
FIG. 21 is a side view similar to FIG. 20, but showing the vehicle pushing the example barrier in a forward direction.

Referring to FIG. 20, after RIG 20 pushes main body 28 down to a lowered operative elevation or position (FIGS. 20-23), and after vehicle 12 moves its RIG 20 sufficiently close to dock face 14, actuator 38 extends. Actuator 38 extends to rotate barrier 104 upward from its stored position (FIG. 19) to its upper blocking position (FIG. 20). The angle or force imparted by actuator 38 to barrier 104 holds shaft 32 to the right end of slot 46. Thus, actuator 38 extends to rotate barrier 104 about first axis 58 upward along the predetermined non-obstructed path 62 to the upper blocking position of FIG. 20. At this point, vehicle 12 is restrained, and dock leveler 24 can be deployed.

Figure 22:
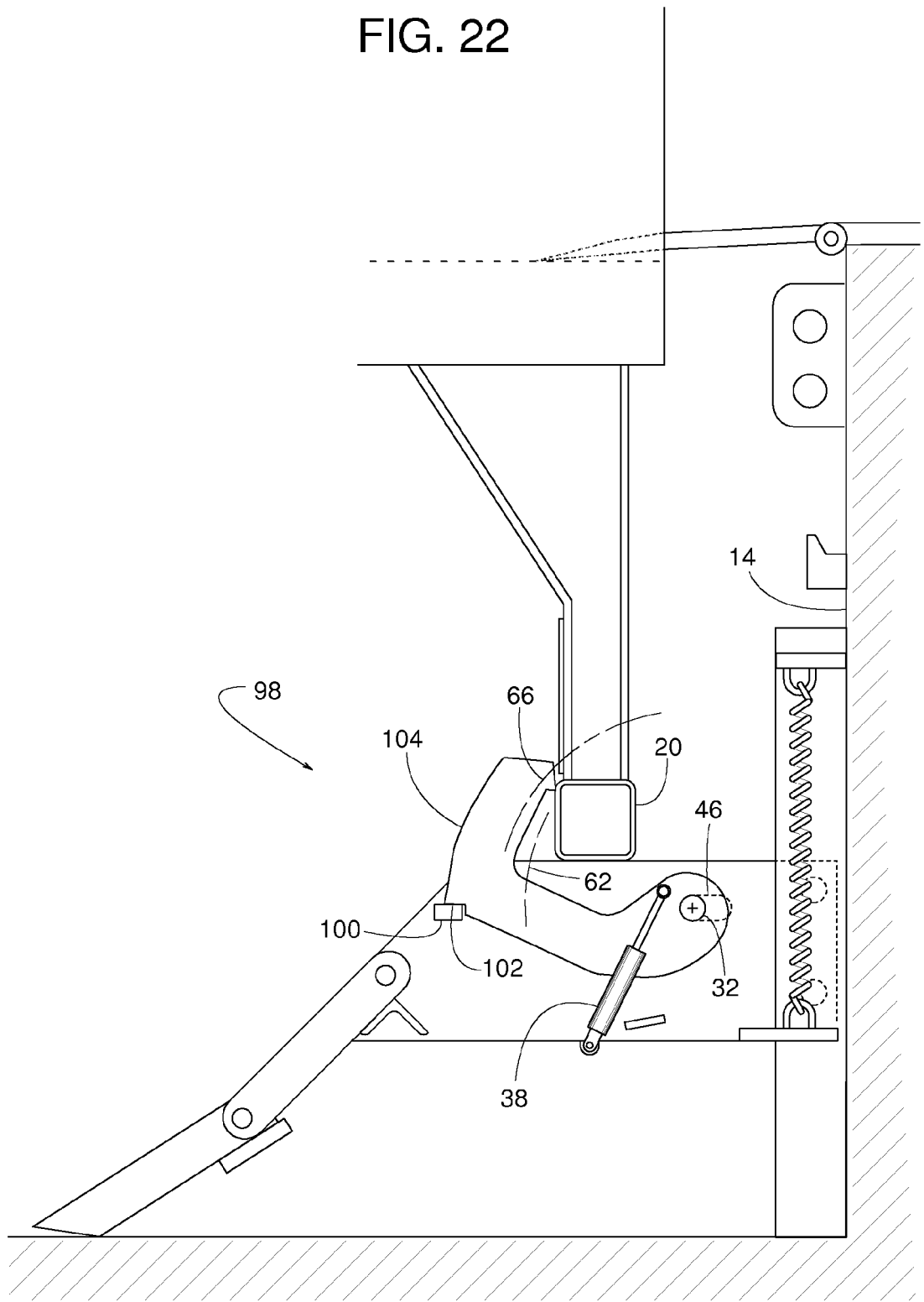
FIG. 22 is a side view similar to FIG. 21, but showing the vehicle having pushed the example barrier to an example intermediate blocking position.

If, while being restrained, vehicle 12 moves forward away from dock face 14, RIG 20 might exert sufficient force 64 to push or rotate barrier 104 a limited distance forward and down from the blocking position to an intermediate blocking position, shown in FIG. 22. In reaction to RIG 20 pushing or rotating barrier 104 away from dock face 14, shaft 32 translates from the right end to the left end of slot 46 (i.e., shaft 32 slides or translates laterally from its position of FIG. 20 to that of FIG. 21). The translation of shaft 32 shifts rotation of barrier 104 from the predetermined non-obstructed path 62 to obstructed path 66. RIG 20 further pushing or shifting barrier 104 laterally away from dock face 14 causes barrier 104 to rotate downward along obstructed path 66 until striker 102 engages stop 100 as shown in FIG. 22. A mechanical engagement between striker 102 and stop 100 prevents RIG 20 from pushing or rotating barrier 104 below or beyond (e.g., lower than) the intermediate blocking position shown in FIG. 22.

Figure 23:
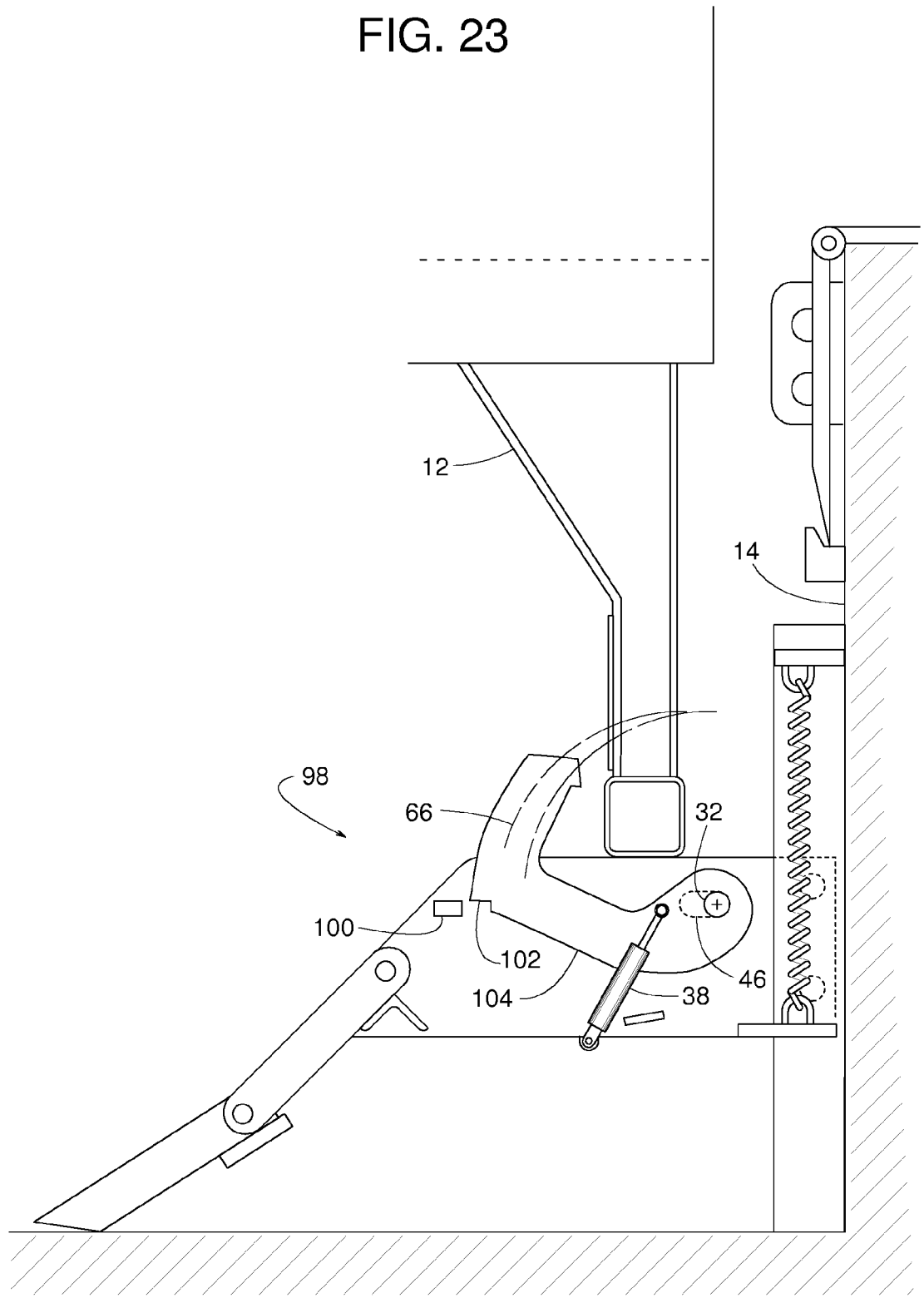
FIG. 23 is a side view similar to FIG. 22, but showing the example vehicle restraint moving to release the vehicle.

Referring to FIG. 23, to release vehicle 12 from the condition shown in FIG. 22, vehicle 12 moves back toward dock face 14 and actuator 38 retracts. With actuator 38 at the position or angle shown in FIG. 23, the weight of barrier 104 on actuator 38 urges actuator 38 to rotate clockwise (as viewed in FIG. 23) to hold shaft 32 at the right end of slot 46 so striker 102 clears stop 100 as actuator 38 retracts while barrier 104 retracts under its own weight. As barrier 104 descends from its position of FIG. 23 to its stored position of FIG. 18, barrier 104 rotates along the predetermined non-obstructed path 62.

Figure 24:
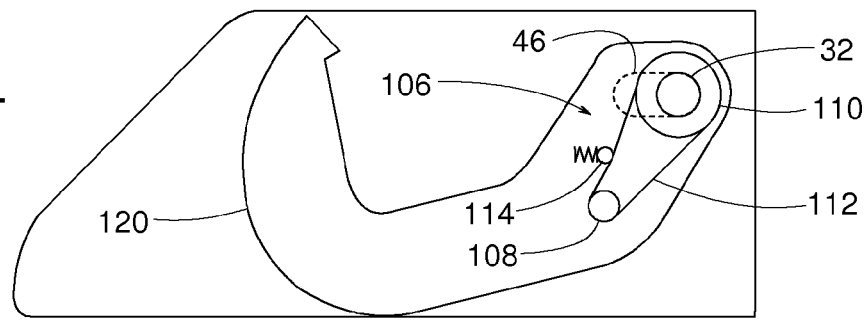
FIG. 24 is a schematic side view similar to FIGS. 1, 6, 12 and 18, but showing an example barrier and an example actuator each constructed according to the teachings disclosed herein.
Figure 25:
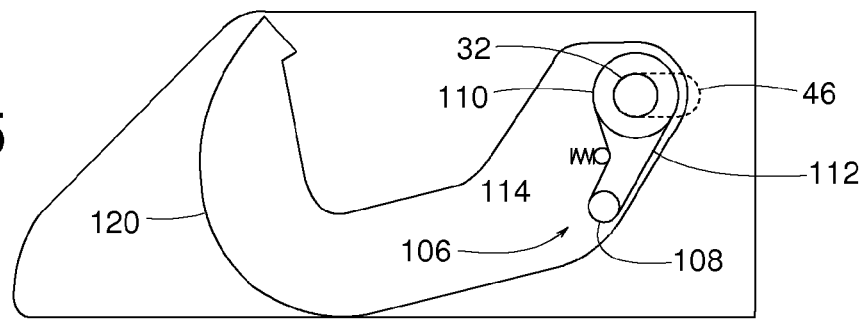
FIG. 25 is a schematic side view similar to FIG. 24 but showing the example barrier of FIG. 24 at a different position.

As alternatives to actuator 38, in some examples, actuator 38 is replaced by some other actuators, drives and/or drive means. FIGS. 24 and 25, for example, show a barrier-moving actuator 106 comprising a motor powered drive sprocket 108, a driven sprocket 110 and a roller chain 112. In some examples, actuator 106 also includes an idler sprocket 114 for taking up slack in chain 112 as shaft 32 translates along slot 46 between the right end of slot 46 (FIG. 24) and the left end of slot 46 (FIG. 25).

In the illustrated example, drive sprocket 108 is powered by a motor (e.g., electric, hydraulic, pneumatic, etc.). Driven sprocket 110, in this example, is keyed or otherwise attached to shaft 32 so that driven sprocket 110, shaft 32 and an example barrier 120 rotate together as a unit. Barrier 120 is schematically illustrated to represent any vehicle-restraining barrier including, but not limited to, barriers 18, 94 and 104. The rotational direction of drive sprocket 108 determines whether barrier 120 ascends or descends. In some examples, actuator 106 includes a slip clutch that allows RIG 20 to forcibly rotate barrier 120 without damaging actuator 106. In some examples, cogged wheels and belts provide an equivalent alternative to the schematically illustrated sprockets and chains.

Figure 26:
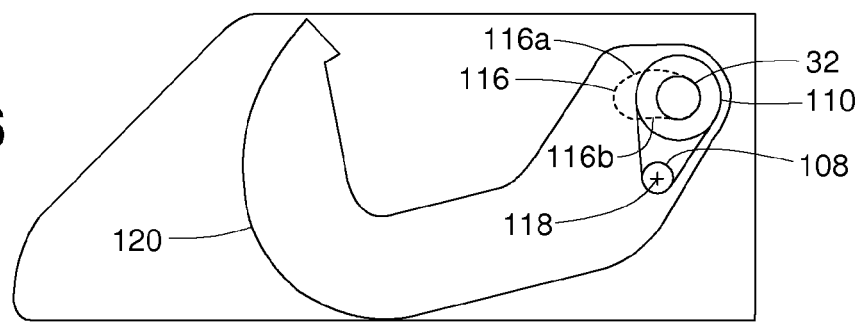
FIG. 26 is a schematic side view similar to FIGS. 1, 6, 12 and 18 but showing an example barrier and an example actuator each constructed according to the teachings disclosed herein.
Figure 27:
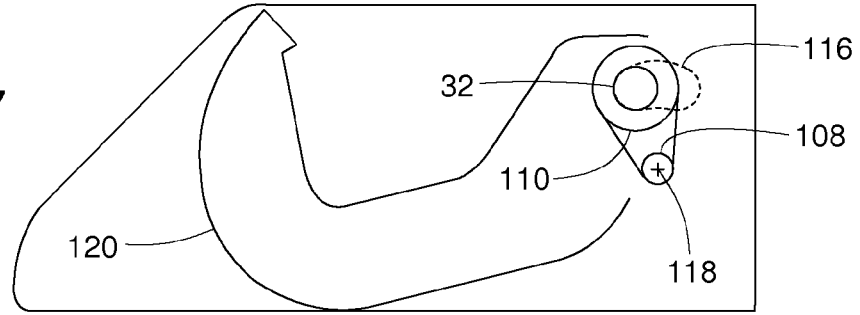
FIG. 27 is a schematic side view similar to FIG. 26, but showing the example barrier of FIG. 26 at a different position.

FIGS. 26 and 27 show another example of an alternative to actuator 38 that eliminates the need for idler sprocket 114. Instead, a slot 116 similar to slot 46 has side edges 116a and 116b that curve about a centerline 118 of drive sprocket 108.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle restraint to engage a RIG (rear impact guard) of a vehicle at a loading dock, the vehicle restraint comprising:
   a main body installable at the loading dock; and
   a barrier to be coupled to the main body, the barrier to rotate about an axis relative to the main body along a first path between an upper blocking position to block the RIG and a stored position to release the RIG when the axis is at a first position spaced from a wall of the loading dock, the barrier and the axis to move laterally to a second position spaced from the wall of the loading dock when the RIG is engaged with the barrier and the RIG moves in a direction away from the wall, the second position being farther away from the wall than the first position, the barrier to rotate about the axis along a second path different than the first path when the axis is in the second position.

2. A vehicle restraint to engage a RIG (rear impact guard) of a vehicle at a loading dock, the vehicle restraint comprising:
   a main body installable at the loading dock; and
   a barrier to be coupled to the main body, the barrier to rotate about an axis relative to the main body between an upper blocking position to block the RIG and a stored position to release the RIG, for a given elevation of the main body the barrier being higher in the upper blocking position than in the stored position, the barrier and the axis to move radially with respect to the main body;
   a stop positioned on the main body; and
   a striker positioned on the barrier, the barrier being selectively movable to a non-obstructed path and an obstructed path, the barrier being movable to an intermediate blocking position along the obstructed path, for the given elevation of the main body the barrier being higher in the intermediate blocking position than in the stored position, for the given elevation of the main body the barrier being lower in the intermediate blocking position than in the upper blocking position, the striker to engage the stop when the barrier is at the intermediate blocking position along the obstructed path, the striker to not engage the stop when the barrier rotates along the predetermined non-obstructed path.

3. The vehicle restraint of claim 2, wherein the main body is vertically movable between an elevated preparatory elevation and a lowered operative elevation.

4. The vehicle restraint of claim 2, wherein the barrier is urged to the non-obstructed path.

5. The vehicle restraint of claim 4, wherein the barrier is spring urged to the non-obstructed path.

6. The vehicle restraint of claim 2, wherein the barrier is laterally movable relative to the main body to selectively enable the barrier to rotate along the non-obstructed path and the obstructed path.

7. The vehicle restraint of claim 2, wherein the non-obstructed path is substantially circular.

8. The vehicle restraint of claim 2, further comprising an actuator coupled to the barrier and the main body, retraction of the actuator to urge the barrier to rotate toward the storage position and to urge the barrier to the non-obstructed path.

9. The vehicle restraint of claim 2, wherein at least one of the stop and the striker is spring loaded.

10. The vehicle restraint of claim 2, wherein at least one of the stop and the striker is spring loaded in a direction generally parallel to the axis.

11. A vehicle restraint to engage a RIG (rear impact guard) of a vehicle at a loading dock, the vehicle restraint comprising:
    a main body installable at the loading dock; and
    a barrier coupled to the main body and movable along a non-obstructed path relative to the main body to block and release the RIG of the vehicle, the barrier while on the non-obstructed path being movable between an upper blocking position and a stored position, for a given elevation of the main body the barrier being higher in the upper blocking position than in the stored position, the barrier being further movable to an intermediate blocking position relative to the main body, for the given elevation of the main body the barrier being higher in the intermediate blocking position than in the stored position, for the given elevation of the main body the barrier being lower in the intermediate blocking position than in the upper blocking position, and the barrier at the intermediate blocking position being displaced relative to the main body to enable rotation of the barrier along an obstructed path instead of the non-obstructed path.

12. The vehicle restraint of claim 11, further comprising a stop on the main body and a striker on the barrier, wherein the striker engages the stop when the barrier is at the intermediate blocking position, and the striker is spaced apart from the stop when the barrier is anywhere along the non-obstructed path.

13. The vehicle restraint of claim 12, wherein at least one of the stop and the striker is spring loaded.

14. The vehicle restraint of claim 12, wherein at least one of the stop and the striker is spring loaded in a direction generally perpendicular to the non-obstructed path.

15. The vehicle restraint of claim 11, wherein the main body is vertically movable between an elevated preparatory elevation and a lowered operative elevation.

16. The vehicle restraint of claim 11, wherein the barrier is spring urged to rotate along the non-obstructed path.

17. The vehicle restraint of claim 11, wherein the barrier is movable in translation relative to the main body to rotate along the obstructed path.

18. The vehicle restraint of claim 11, wherein the predetermined non-obstructed path is substantially arcuate.

19. The vehicle restraint of claim 11, further comprising an actuator coupled to the barrier and the main body, retraction of the actuator to urge the barrier to rotate toward the storage position and to urge the barrier to rotate along the non-obstructed path.

20. A vehicle restraint to engage a RIG (rear impact guard) of a vehicle proximate a dock face of a loading dock, the vehicle restraint comprising:
    a main body installable at the loading dock;
    a shaft supported by the main body, the shaft being laterally movable relative to the main body between a first lateral position and a second lateral position;
    a barrier supported by the shaft, the barrier to move between an upper blocking position to block the RIG, an intermediate blocking position to block the RIG and a stored position to release the RIG, for a given elevation of the main body the barrier being higher in the intermediate blocking position than in the stored position, for the given elevation of the main body the barrier being higher in the upper blocking position than in the intermediate blocking position;

a stop on the main body; and a striker on the barrier, the striker clearing the stop when the barrier rotates about a first axis from above the intermediate blocking position to below the intermediate blocking position, the striker to engage the stop when the barrier rotates about a second axis from the upper blocking position to the intermediate blocking position, the second axis being farther away relative to a wall of the loading dock than the first axis.

21. The vehicle restraint of claim 20, wherein at least one of the stop and the striker is spring loaded.

22. The vehicle restraint of claim 20, wherein at least one of the stop and the striker is spring loaded in a direction generally parallel to the first axis.

23. The vehicle restraint of claim 20, wherein the main body is vertically movable between an elevated preparatory elevation and a lowered operative elevation.

24. The vehicle restraint of claim 20, wherein the barrier is spring urged from the second axis toward the first axis.

25. The vehicle restraint of claim 20, wherein the barrier is movable in translation relative to the main body.

* * * * *